(12) United States Patent
Kazmi et al.

(10) Patent No.: US 9,693,251 B2
(45) Date of Patent: *Jun. 27, 2017

(54) METHODS FOR PERFORMING PARALLEL WIRELESS SIGNAL MEASUREMENTS

(71) Applicant: TELEFONAKTIEBOLAGET LM ERICSSON (PUBL), Stockholm (SE)

(72) Inventors: Muhammad Kazmi, Bromma (SE); Iana Siomina, Täby (SE)

(73) Assignee: Tekefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/271,323

(22) Filed: Sep. 21, 2016

(65) Prior Publication Data

US 2017/0013488 A1  Jan. 12, 2017

Related U.S. Application Data

(63) Continuation of application No. 14/041,597, filed on Sep. 30, 2013.

(Continued)

(51) Int. Cl.
*H04W 24/10* (2009.01)
*H04W 24/08* (2009.01)
(Continued)

(52) U.S. Cl.
CPC ............... *H04W 24/08* (2013.01); *G01S 5/00* (2013.01); *G01S 5/02* (2013.01); *G01S 5/12* (2013.01);
(Continued)

(58) Field of Classification Search
CPC .. H04B 17/318; H04W 52/24; H04W 52/242; H04W 52/143; H04W 24/10; H04W 24/08; H04W 24/02; H04W 28/18
See application file for complete search history.

(56) References Cited

U.S. PATENT DOCUMENTS

| | | | | |
|---|---|---|---|---|
| 9,462,563 | B2* | 10/2016 | Siomina | H04W 56/004 |
| 2011/0207477 | A1* | 8/2011 | Siomina | G01S 5/0278 |
| | | | | 455/456.2 |
| 2012/0320845 | A1* | 12/2012 | Choi | G01S 13/876 |
| | | | | 370/329 |

OTHER PUBLICATIONS

Andrew et al.: "Management Procedures for under LMUP Protocol", 3GPP Draft; R2—122296 Management Procedures under LMUP Protocol, 3rd Generational Partnership Project (3GPP), Mobile Competence Centre, filed on May 15, 2012.*

* cited by examiner

*Primary Examiner* — Ian N Moore
*Assistant Examiner* — Mewale Ambaye

(57) ABSTRACT

Systems, methods, and apparatuses are presented for performing parallel uplink wireless signal measurements (UL measurements), in which a signal measuring apparatus determines information on UL measurements being performed or to be performed by the signal measuring apparatus over a predetermined measurement period. The signal measuring apparatus further determines a capability of the signal measuring apparatus to perform parallel UL measurements. The signal measuring apparatus may adjust a measurement requirement or a measurement resource based on a comparison of the UL measurements being performed or to be performed over the measurement period with a capability of the measuring apparatus to perform parallel measurements. The signal measuring apparatus performs the UL measurements based on the adjusted measurement requirement or adjusted measurement resource.

24 Claims, 19 Drawing Sheets

Related U.S. Application Data

(60) Provisional application No. 61/708,264, filed on Oct. 1, 2012.

(51) Int. Cl.
*H04W 52/14* (2009.01)
*H04W 52/24* (2009.01)
*G01S 5/12* (2006.01)
*G01S 5/00* (2006.01)
*G01S 5/02* (2010.01)

(52) U.S. Cl.
CPC ......... *H04W 24/10* (2013.01); *H04W 52/143* (2013.01); *H04W 52/24* (2013.01); *H04W 52/242* (2013.01)

METHODS FOR PERFORMING PARALLEL WIRELESS SIGNAL MEASUREMENTS

CROSS-REFERENCE TO RELATED APPLICATIONS

This application is a continuation of U.S. application Ser. No. 14/041,597, now issued as U.S. Pat. No. 9,491,651, filed Sep. 30, 2013, which claims priority to U.S. Provisional Application No. 61/708,264, filed Oct. 1, 2012 and entitled "Methods for Configuring Parallel UL Measurements," the contents of which are fully incorporated herein by reference.

TECHNICAL FIELD

This disclosure relates to systems, methods, apparatus, and computer program products for performing parallel uplink wireless signal measurements

BACKGROUND

Telecommunications systems such as GSM, UMTS, or LTE perform radio measurements for a variety of purposes. For example, a wireless communication device (WCD) or base station may measure a timing, power, or direction of a received radio signal and use the measurement for services such as radio resource management (RRM), mobility management, or location-based services (LBS). Each measurement may correspond to a certain frequency band or radio access technology (RAT). The measurement may be performed by the WCD on a downlink (DL) wireless signal (i.e., a DL measurement) or may be performed by a measuring node on an uplink (UL) wireless signal (i.e., an UL measurement).

Because the signal measurement affects a variety of telecommunications operations, there is a need for a robust way of handling a medium or high volume of measurements, particularly parallel UL measurements.

SUMMARY

A system, method, and apparatus are presented for performing parallel signal measurements. In an embodiment of the system, method, and apparatus, a signal measuring apparatus determines information on uplink (UL) measurements, wherein the UL measurements comprise uplink (UL) wireless signal measurements being performed or to be performed by the signal measuring apparatus over a predetermined measurement period. For example, the signal measuring apparatus may determine a total number of UL measurements that it is performing or has to perform over the predetermined measurement period. The signal measuring apparatus further determines a capability of the signal measuring apparatus to perform parallel measurements. For example, the signal measuring apparatus may determine a maximum number of UL measurements that the apparatus is capable of performing (i.e., capable of performing with measurement resources currently allocated to UL measurements) over the predetermined measurement period. The signal measuring apparatus adjusts a measurement requirement (e.g., measurement period, measurement accuracy) based on a comparison of the UL measurements being performed or to be performed with the capability of the measuring apparatus to perform parallel measurements. The signal measuring apparatus then performs the UL measurements based on the adjusted measurement requirement.

In an embodiment, a signal measuring apparatus determines information on UL measurements being performed or to be performed by the measuring apparatus over a predetermined measurement period. The signal measuring apparatus further determines a capability of the measuring apparatus to perform parallel measurements. The signal measuring apparatus adjusts a measurement resource (e.g., adjusts a receiver configuration, hardware component, or power usage) of the measuring apparatus based on a comparison of the UL measurements with the capability of the signal measuring apparatus to perform parallel measurements. The signal measuring apparatus then performs the UL measurements based on the adjusted measurement resource.

DETAILED DESCRIPTION

Figure 1:
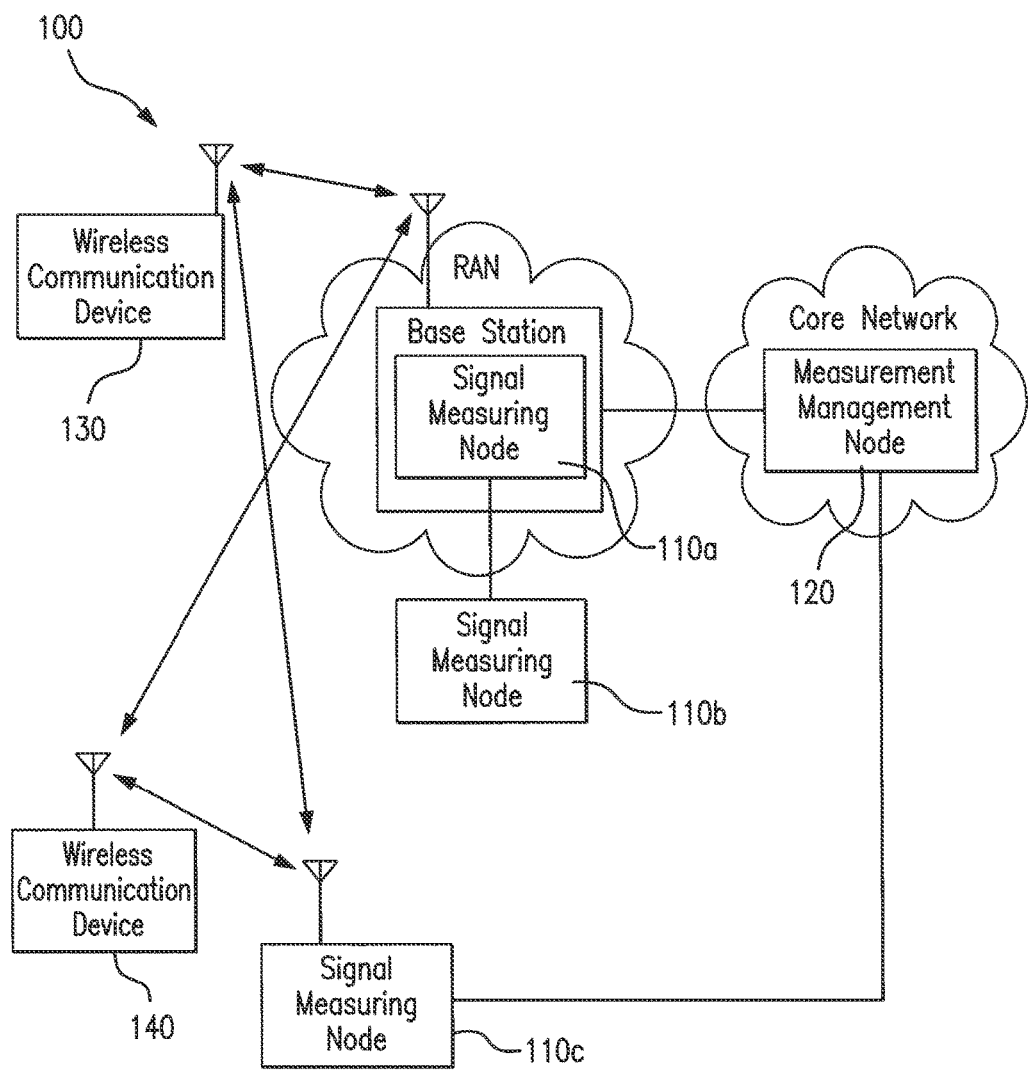
FIG. 1 illustrates a number of nodes in a system for performing UL measurements.

The present Application is concerned with making uplink (UL) wireless signal measurements (i.e., UL measurements) in a telecommunications network. The UL measurements refer to measurements on one or more uplink (UL) wireless signals (i.e., UL signals) that are transmitted from a wireless communication device (WCD) and received by a signal measuring node ("measuring node") of the network. The measurements may be used to determine, for example, signal strength, signal timing, or signal direction. The measurements may be used for many purposes, including determining a position (also referred to as a location) of the WCD, implementing a minimization of drive test (MDT) feature in a telecommunications network, implementing a self-organizing network (SON) feature, or configuring a transmit parameter to be used by the WCD.

A signal measuring node, which performs the UL measurements, may be an apparatus (i.e., signal measuring apparatus) partially or completely integrated into a base station, or may be a standalone device. The signal measuring node may communicate with a measurement management node, which may specify what UL measurements are to be performed and may collect the performed measurements.

The resources required to perform the UL measurements may vary, depending on factors such as the number of UL measurements, the number of WCDs transmitting the UL signals being measured, the frequency bands or carrier frequencies of the UL signals, the radio access technology (RAT) associated with the UL signals, or any combination thereof. In an embodiment, the required resources depend on the measurement requirement. For example, some systems require a measuring node to perform and report the measurement within a predetermined measurement period. As another example, some systems require the measurement to be performed with a predetermined level of accuracy.

In general, it would be inefficient to require measuring nodes to be able to handle any measurement configuration (e.g., any quantity of measurements), any frequency band or carrier frequency of a UL signal being measured, and any radio access technology.

Rather, the measuring node's resources may limit how many UL measurements or what kinds of UL measurements the measuring node can make in parallel. For instance, a measuring node integrated in a macro-cell base station may have more resources for performing UL measurements than a measuring node integrated in a femto-cell base station. The macro-cell base station may, for instance, provide more antennas or receivers for receiving UL signals, provide more processing power, support more radio access technologies, or provide more frequency bands for receiving the UL signals. Thus, different measuring nodes may have different capabilities for performing parallel UL measurements. Performing UL measurements in parallel may involve performing them, at least in part, over the same period of time, such as over a predetermined measurement period. Thus, in various embodiments, parallel measurements may involve two or more measurements that are performed, or scheduled to be performed, simultaneously, periodically over identical measurement periods, and/or over measurement periods that partially overlap. More generally, parallel measurements may represent any two or more measurements that are each associated in some manner with a respective time or time period for which the associated time or time periods are the same or at least partially overlap. Additionally, parallel measurements may represent measurements performed on different radio signals sent by the same wireless device or on radio signals transmitted by one or more different wireless devices. Furthermore, parallel measurements may represent measurements performed on the same or different carrier frequencies.

If the capability differences between measuring nodes are not taken into account when the UL measurements are performed, the resources of the measuring nodes may be used ineffectively. For instance, a measurement management node ("management node") may request or schedule UL measurements to be performed by the measuring node. If the management node does not consider the measuring node's capability to perform parallel UL measurements, it may overload the measuring node with too many UL measurements or under-utilize the measuring node with too few UL measurements. In the former case, the outcome may be unpredictable. The overloaded measuring node may return some of the measurements after an unpredictable amount of delay, return those measurements with an unknown level of accuracy, or simply fail to perform those measurements. Further, overloading the measuring node may lead to a high level of power consumption, signaling overhead, error rate, delay, or any combination thereof.

Currently, LTE telecommunication networks can calculate how many UEs are being served by a particular eNodeB, based on a Quality of Service Class Identifier (QCI) parameter. However, this calculated value does not reflect a measuring node's capability for performing parallel UL measurements.

The current 3GPP TS 36.133 standard for LTE specifies minimum requirements on a WCD's capability for tracking multiple reporting criteria in parallel. The reporting criteria include measurement categories relating to intra-frequency, inter-frequency, and inter-RAT measurements. WCDs can be expected to meet the minimum requirements so long as a measurement configuration does not exceed those requirements. However, because measuring nodes that perform UL measurements may vary widely in resources and capabilities, from nodes integrated in a cell phone tower to a stand-alone node in a femto-cell, specifying a uniform minimum requirement for all measuring nodes that perform UL measurements would be costly and inefficient. Similarly, requiring all such measuring nodes, or even just all base stations, to be able to perform any number of parallel UL measurements over all declared frequencies, radio access technologies (RATs), and frequency bands would also be costly and efficient. Thus, other systems and methods for handling UL measurements in a robust and predictable manner are needed.

Such systems and methods are described below. In general, information on what UL measurements a measuring node is performing or is to perform in a period may be determined. Information on the capability of the measuring node for performing parallel UL measurements may also be determined. Either piece of information may be tracked by at least one of the signal measuring node itself, a measurement management node, or another node. This information can be used to make adjustments, such as to at least one of measurement resources allocated to performing UL measurements, the measurement requirement, a WCD transmission configuration, or a measurement configuration. The measurement resources may include receivers and processors at a measuring node. Adjusting the measurement resources may thus include adjusting a receiver configuration, which controls radio resources (e.g., antennas) on the measuring node, and a processor configuration, which controls processing circuitry on the measuring node. The WCD transmission configuration specifies how the WCD should transmit UL signals (e.g., what carrier frequency to use). The measurement configuration specifies what UL measurements the measuring node is to perform or one or more parameters of the UL measurements. The measurement requirement specifies, for instance, the measurement period or a measurement accuracy. In an embodiment, the measurement requirement may be a subset of the measurement configuration. The configurations listed above may be adjusted by one or more of the measuring node and the measurement management node.

Thus, in various embodiments, the capability of a measuring node for performing parallel measurements may be accounted for, and adjustments may be dynamically made to handle UL measurements in a robust and predictable manner.

FIG. 1 illustrates an example system 100 for performing parallel UL measurements. The system 100 includes one or more signal measuring nodes (e.g., signal measuring node 110a, signal measuring node 110b, or signal measuring node 110c), one or more measurement management nodes (e.g., measurement management node 120), and one or more wireless communication devices (e.g., WCD 130 and WCD 140).

The signal measuring node ("measuring node") may be a component configured to receive a UL signal, process a UL signal, perform a calculation on the UL signal, or any combination thereof. The measuring node may be a component that is integrated into a base station, such as signal measuring node 110a, or may be a standalone component. Some standalone measuring nodes, such as measuring node 110b, may independently process UL signals, but may still interface with the base station to receive the UL signals from the base station's radio equipment (e.g., its antennas). Some standalone measuring nodes, such as measuring node 110c, may have their own radio equipment, and may have no interface with the base station. As an example, signal measuring node 110a may be part of a base station of a cellular phone radio access network (RAN), while signal measuring node 110c may be a router, relay, or sensor in a home or office.

The measurement management node ("management node") 120 may be an apparatus (i.e., measurement management apparatus) configured to communicate with the signal measuring nodes (e.g., 110a, 110b, 110c) to manage what UL measurements each measuring node performs, to collect UL measurements from the measuring nodes, or any combination thereof. For example, the management node 120 may instruct both signal measuring nodes 110a and 110c to perform a measurement on UL signals from wireless communication device 130. In the example, the management node 120 may collect the measurement from both nodes 110a, 110c for storage, further processing, transmission to another node, or any combination thereof. In an embodiment, management node 120 may be part of a core network of the system 100. Examples of the management node includes one or more of the positioning node, coordinating node, and operations and management (O&M) node. The core network interfaces the RAN to the Internet. Although FIG. 1 illustrates a direct connection between the management node 120 and the signal measuring nodes, they may instead be connected through a plurality of intermediate communication devices.

FIG. 1 illustrates that each signal measuring node may receive UL signals from different WCD's in a common time window or period of time (i.e., in parallel). For instance, signal measuring node 110a may receive both a UL signal from WCD 130 and a UL signal from WCD 140 in a certain time period.

Figure 2:
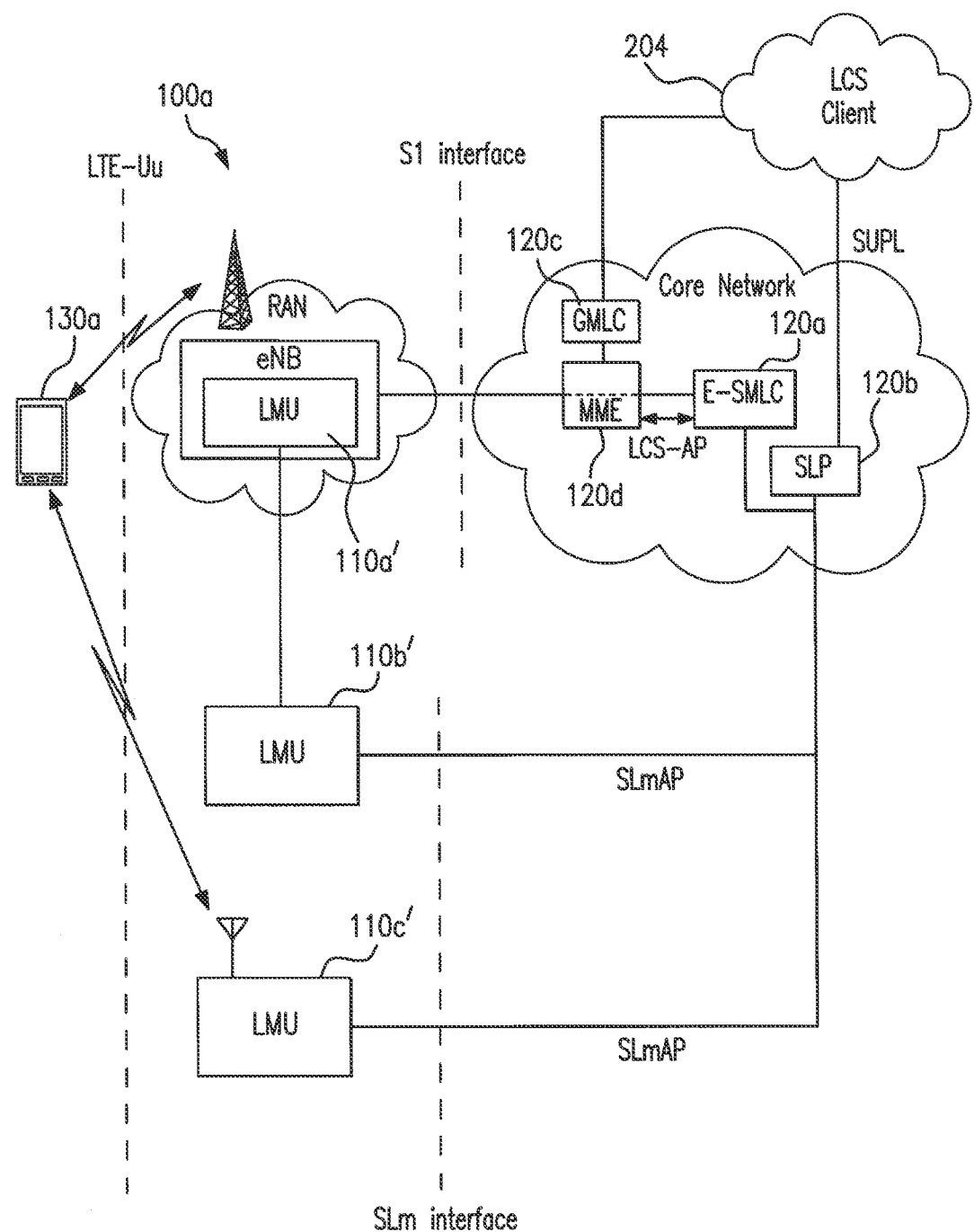
FIG. 2 illustrates a number of nodes in a LTE system for performing UL measurements.

The system 100 may be implemented as part of a GSM, UMTS, LTE, or any other type of telecommunications network. For example, FIG. 2 illustrates an example LTE system 100a for performing parallel UL measurements. In the example, the signal measuring nodes are location measurement units (LMUs) that are integrated into an eNB base station (e.g., LMU 110a') or are standalone LMUs (e.g., LMU 110b' and LMU 110c'). The WCD in FIG. 2 is user equipment (UE). Further, the measurement management node in this figure is a positioning node configured to determine the position of WCD 130a, and includes at least one of an evolved serving management location center (e-SMLC) device 120a, a support for location services (SLP) device 120b, a gateway mobile location center (GMLC) device 120c, and a mobility management entity (MME) device 120d. The integrated LMU 110a' in the example may communicate with the management node through a control plane interface such as the Si interface. The LMU 110b' or 110c' may communicate with the management node through a user plane interface such as SLmAP.

FIG. 2 further illustrates that the system 100a may be part of LTE's Location Service (LCS) system. LCS implements a location-based service (LBS) in which a LCS client can request that a LCS server determine the location of a LCS target. In FIG. 2, WCD 130a may be the LCS target while the management node may make up the LCS server. A LCS client 204 may communicate a location determination request to the LCS server.

The LTE positioning architecture illustrated in FIG. 2 will be explained in more detail in a later section. In general, a plurality of signal measuring nodes, such as some or all of LMU's 110a', 110b', and 110c', may perform UL measurements on UL signals from a WCD, such as WCD 130a. In some cases, the measurement from a measuring node may indicate signal strength, signal timing, or signal direction at the node's location. The measurements may be collected by the measurement management node, such as e-SMLC 120a and SLP 120b, which may calculate a position or location of the WCD, such as by triangulation. The calculation may be based on a variety of position determination techniques, such as uplink time difference of arrival (UTDOA), which determines the WCD's position relative to the positions of the measuring nodes based on how long it takes for a UL signal from the WCD to reach each of the measuring nodes. The UL measurements may be used for other applications, such as MDT implementation or SON implementation, which are discussed in later sections.

Exemplary Methods

Figure 3:
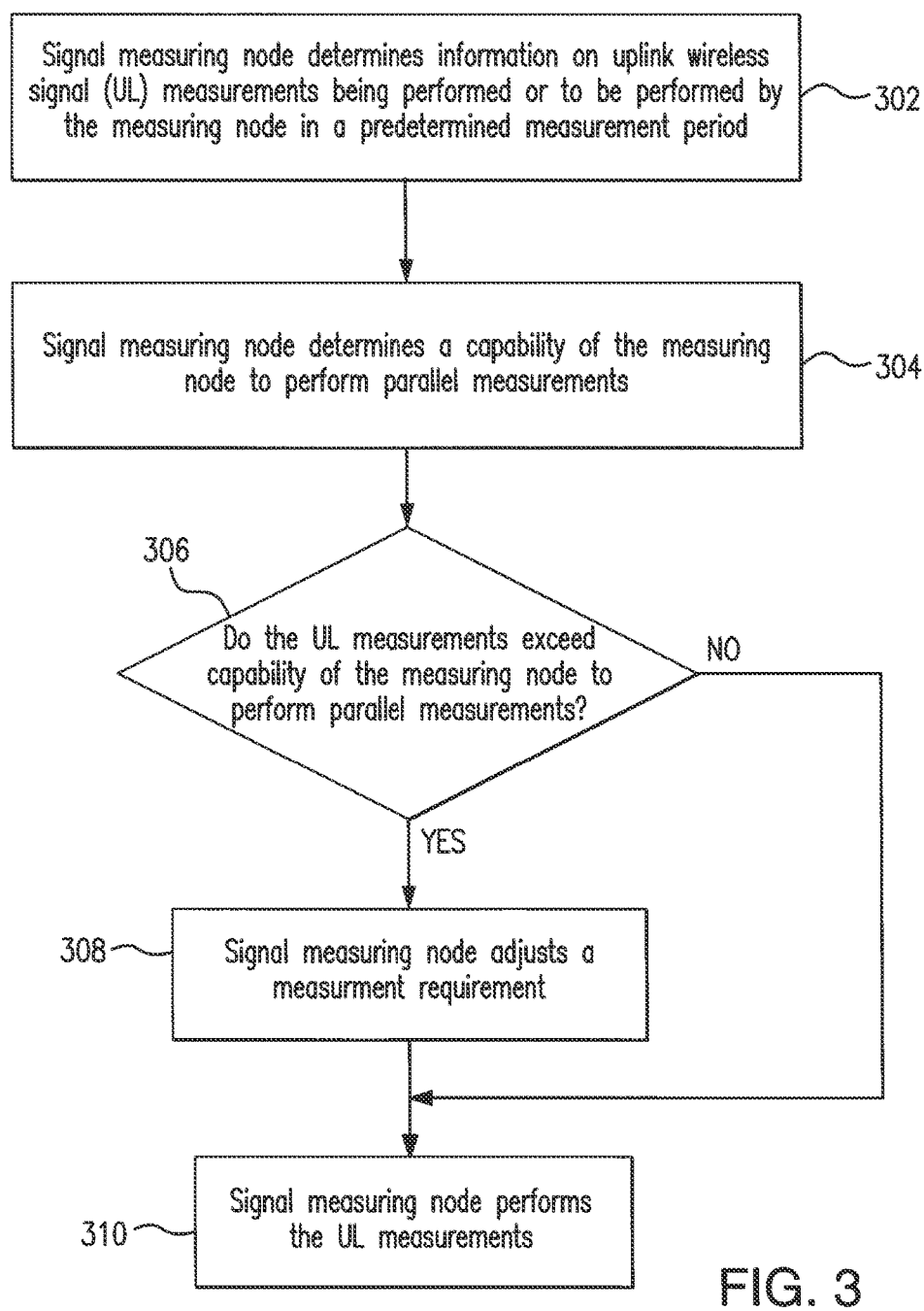
FIGS. 3-16 illustrate flow diagrams according to embodiments of the present disclosure.

FIG. 3 is a flow diagram illustrating a process 300 performed by a measuring node to dynamically adjust a measurement requirement. Process 300 allows the signal measuring node to gauge whether it is being overloaded with measurements being performed or to be performed in a time window (also referred to as a time period), and to dynamically adjust the measurement requirement if it is being overloaded. This deliberate adjustment avoids the situation in which an overloaded measuring node may fail to perform a measurement, perform it after an unpredictable amount of delay, or return a measurement with an unknown level of accuracy. Rather, if the measurement period, measurement accuracy, or other measurement requirement is adjusted, the adjusted value will be predictable and known to at least one of the measuring node, management node, and any other node notified of the adjustment.

In an embodiment, the process 300 begins at step 302, where the signal measuring node (e.g., measuring node 110a) determines information on UL measurements being performed or to be performed by the measuring node over a predetermined measurement period. The information on UL measurements may reflect what resources are needed to perform the measurements. For example, the information may indicate a total number of UL measurements being performed or to be performed over the predetermined measurement period, a total number of WCDs that will be transmitting UL signals for the measurements, a total bandwidth needed to perform the UL measurements, a set of frequency bands needed to perform the UL measurements, a set of radio access technologies (RATs) needed to perform the UL measurements, a set of calculations needed to perform the UL measurements, an amount of processing power or processing time needed to perform the UL measurements, or any combination thereof.

In an embodiment, the predetermined measurement period may be pre-set in the measuring node, such as by a network operator. In an embodiment, the predetermined measurement period may be a value previously set by the measuring node itself or by the measurement management node. The predetermined measurement period defines, for example, a time window in which the measuring window has to perform all measurements that had been requested or scheduled at the beginning of the time window and all measurements that was being performed (i.e., not completed) at the beginning of the time window. In an embodiment, the predetermined measurement period includes at least one of a time when UL signals are received or sampled, a pre-processing time to process a measurement request, and a post-processing time. Performing UL measurements in parallel generally refers to performing them at various times within the same measurement period.

As an example, the signal measuring node in step 302 may determine that the measurement management node has requested or scheduled four UL measurements to be performed over the predetermined measurement period (e.g., a 10 millisecond, 100 millisecond, or 1-second window). The signal measuring node may further determine that two UL measurements previously requested by the management node are currently still being performed or still need to be performed. Thus, in the example, the signal measuring node may determine that there are six UL measurements that the node is performing or has to perform over the measurement period.

In step 304, the measuring node determines a capability of the measuring node to perform parallel measurements. In an embodiment, the capability of the measuring node to perform parallel measurements refers to one or more of the following: a) a maximum number of UL measurements the signal measuring node is capable of performing (i.e., capable of performing with measurement resources currently allocated to UL measurements) over the predetermined measurement period, b) a maximum number of UL signals that the measuring node is capable of receiving over the predetermined measurement period, c) a maximum number of calculations that the measuring node is capable of making over the predetermined measurement period, and d) a maximum number of WCDs the measuring node is capable of receiving UL signals from over the predetermined measurement period. As an example, the signal measuring node may be limited in how many UL signals it can receive in a given time period based on how many antennas it has, on the ability of the antennas to differentiate between different UL signals, on how many frequency bands the measuring node can monitor over the measurement period, how many calculations the measuring node can perform over the measurement period, on power constraints, or any combination thereof.

In an embodiment, the capability of the measuring node for performing parallel measurements may be pre-set by a network operator or manufacturer, or may be calculated as a function of hardware, software, or other resources of the measuring node. In an embodiment, the capability of the measuring node to perform parallel measurements may depend on a measurement category. For example, the measuring node may specify a maximum number of measurements that it is capable of performing for each category, and may specify an overall maximum number of measurements that it is capable of performing.

In an embodiment, the capability of the measuring node may depend on the measurement requirement. The signal measuring node may report different capability information for different measurement requirements. For instance, if one level of measurement accuracy is being required, the measuring node may report a first maximum number of UL measurements supported by the node. If a higher level of measurement accuracy is being required, the measuring node may report a second, lower maximum number of UL measurements supported by the node. Other examples of factors that affect the capability of the measuring node for performing parallel UL measurements are provided further below.

In step 306, the signal measuring node determines whether the UL measurements being performed or to be performed by the signal measuring node over the predetermined measurement period exceed a capability of the measuring node to perform parallel measurements. The determination may reflect, for instance, whether sufficient resources have been allocated to the signal measuring node to perform the UL measurements over the predetermined measurement period. In some cases, the determination may be based on whether the total number of UL measurements being performed or to be performed over the predetermined measurement period is greater than the maximum number of UL measurements supported by the measuring node in the period. In some cases, the determination may be based on the frequency bands or carrier frequencies of the UL signals. If too many UL signals are transmitted on the same frequency band, the measuring node may be unable to receive all of those UL signals in the same measurement period. In some cases, the determination may be based on the radio access technology (RAT) used to transmit the UL signals. If a UL signal is transmitted using a RAT that is not supported by the measuring node, it may be unable to perform a measurement on the UL signal. In some cases, the determination may be based on how many WCDs are transmitting the UL signals. The measuring node may be unable to accommodate more than a certain number of WCDs, even if the total number of UL measurements does not exceed the maximum.

While the embodiment in step 306 discusses determining whether the capability of the measuring node has been exceeded by the UL measurements, another embodiment of step 306 or of any other step may determine whether the UL measurements are within a threshold amount of exceeding the capability of the measuring node, or may determine whether the UL measurements has exceeded the capability by more than the threshold amount.

In step 308, the signal measuring node adjusts a measurement requirement in response to determining that the capability of the measuring node for performing parallel measurements is exceeded.

In an embodiment, the measurement period is a measurement requirement. In this embodiment, because the measuring node has determined that the UL measurements being performed or to be performed over the predetermined measurement period exceeds its capability for performing the measurements, the node extends the measurement period. In some cases, extending the predetermined measurement period may involve notifying another node, such as the measurement management node. Adjusting the predetermined measurement period is discussed in more detail with respect to FIG. 6.

In an embodiment, the measurement requirement may include a measurement accuracy level. In this embodiment, the signal measuring node may have determined that the node does not have the capability for performing the UL measurements both within the predetermined measurement period and at the measurement accuracy level. For instance, the accuracy in measuring a UL signal may be affected by how much time is used to sample the UL signal, how much bandwidth is used to sample the UL signal, at how many points in time or points in frequency is the UL signal sampled, or any combination thereof. If too many UL measurements are being scheduled or requested at the measuring node, the individual sampling times for the UL signals may add to a total that is longer than the predetermined measurement period. In this embodiment, the signal measuring node may adjust the measurement requirement by reducing the measurement accuracy of each UL measurement. The reduction may allow the signal measuring node to sample each UL signal for a shorter duration, which may allow more UL signals to be sampled, which may allow more UL measurements to be performed over the predetermined measurement period. Adjusting the measurement period is discussed in more detail below with respect to FIG. 7. Adjusting the measurement requirement may thus include adjusting at least one of the predetermined measurement period, the measurement accuracy, and any other measurement requirement.

Although the determination and adjustment steps illustrated above are performed by the signal measuring node, one or more of the steps may also or alternatively be performed by another node, such as the measurement management node. In such a scenario, the measurement management node may track which UL measurements it has requested or scheduled the measuring node. By also tracking which of those UL measurements the measuring node has completed, the measurement management node may determine which remaining UL measurements the measuring node is still performing or has to perform over the measurement period. If the number of outstanding UL measurements exceeds the capability of the measuring node to perform parallel measurements, the measurement management node may adjust the measurement requirement by relaxing it. The adjusted measurement requirement may then be communicated to the measuring node.

In step 310, the signal measuring node performs the UL measurements according to the measurement requirement, which may have been adjusted at step 308. As discussed in more detail below, performing a UL measurement may involve at least one of receiving a UL signal and performing a calculation on the UL signal. In some instances, two UL measurements may involve two different calculations performed on the same UL signal.

Figure 4:
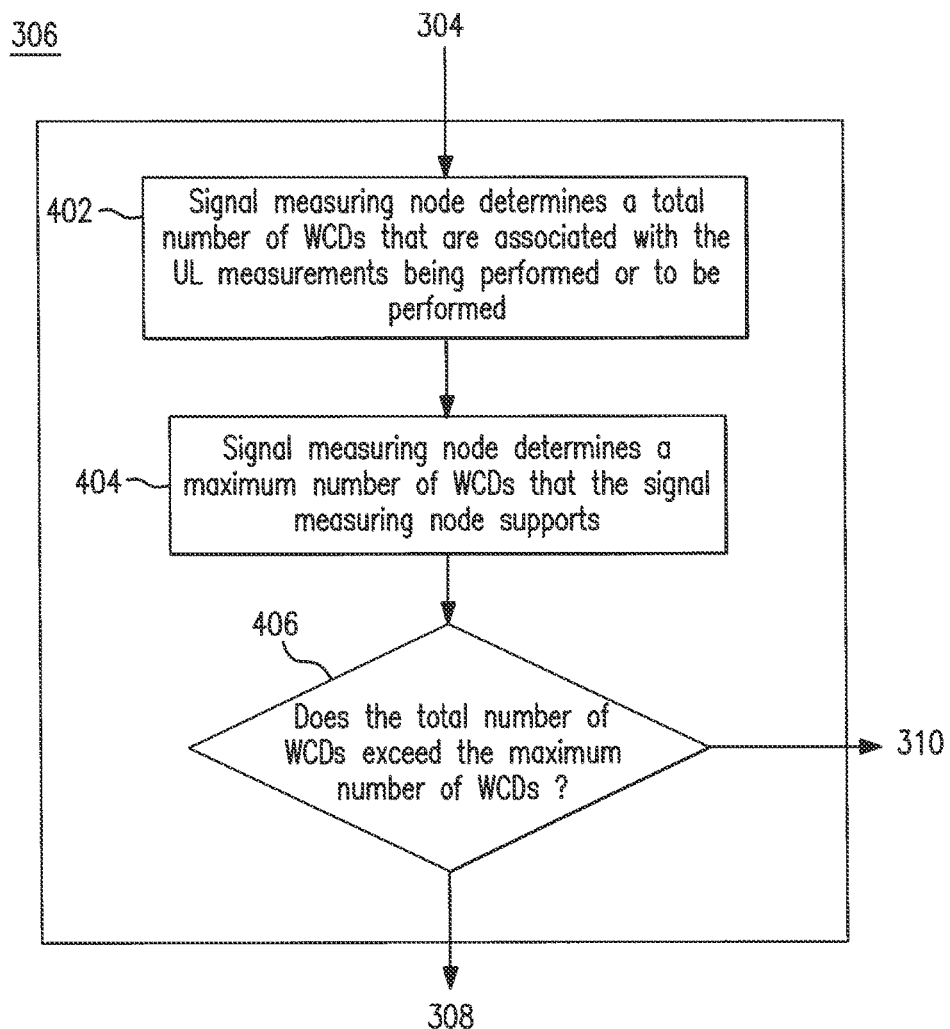

FIG. 4 is a flow diagram that provides a more detailed example of step 306, in which a determination is made on whether the UL measurements being performed or to be performed by the measuring node over the predetermined measurement period exceed the capability of the measuring node. In this example, the capability of the measuring node to perform parallel measurements reflects a maximum number of WCDs from which the node is capable of receiving UL signals over the predetermined measurement period. Thus, at step 402, the signal measuring node determines a total number of WCDs that will be transmitting UL signals to be measured over the predetermined measurement period. In some instances, the number of WCDs may be equal to the number of UL measurements, such that one UL measurement is performed for one WCD. In some instances, the number of WCDs may be less than the number of UL measurements, such that multiple UL measurements may be performed for one WCD.

In step 404, the signal measuring node determines a maximum number of WCDs that the measuring node is capable of receiving UL signals from. The maximum number of WCDs may be pre-set by a network operator or manufacturer, or may be dynamically determined.

In step 406, the signal measuring node determines whether the total number of WCDs that will be transmitting UL signals for measurement over the predetermined measurement period exceeds the maximum number of WCDs supported by the measuring node. In the illustrated example, the signal measuring node proceeds to adjust a measurement requirement in step 308 in response to determining that the maximum number of WCDs supported by the node is exceeded or proceeds to perform the UL measurements without adjusting the measurement requirement in response to determining that the maximum number is not exceeded.

As discussed above, while the illustrated embodiment involves determining whether the total number of WCDs that will be transmitting UL signals exceeds the maximum number of WCDs supported by the measuring node, another embodiment may involve determining whether the total number of WCDs is within a threshold amount of exceeding the maximum number, or whether the total number has exceeded the maximum number by more than the threshold amount.

Figure 5:
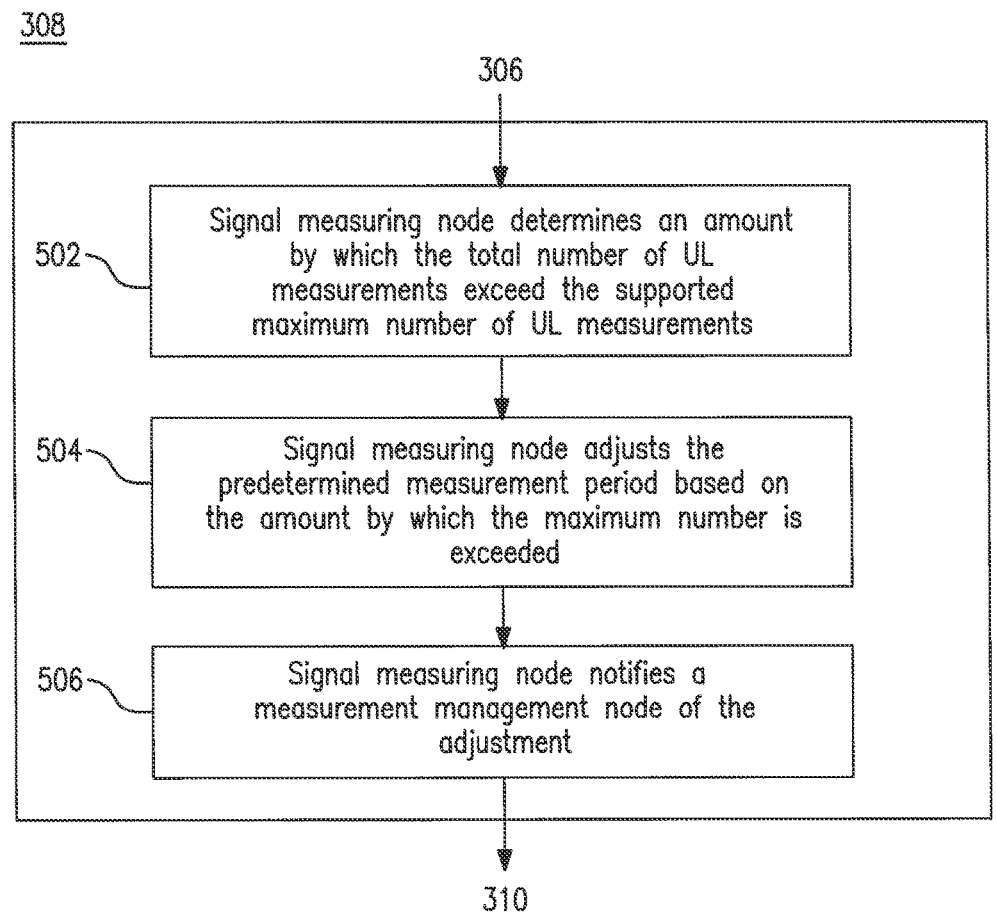

FIG. 5 is a flow diagram that provides a more detailed example of the adjustment step 308. In this example, the signal measuring node extends the predetermined measurement period. The amount of extension is based on how much the capability of the measuring node for performing parallel UL measurements has been exceeded. In step 502, the signal measuring node determines an amount by which the total number of UL measurements being performed or to be performed exceeds the maximum number of UL measurements supported by the measuring node.

In step 504, the signal measuring node adjusts the predetermined measurement period based on the amount by which the maximum number is exceeded. In some instances, the adjustment may also or alternatively be based on at least one of: a number of WCDs transmitting the measured UL signals, a maximum number of WCDs supported by the measuring node, a receiver configuration (e.g., bandwidth, frequency, carrier aggregation (CA) configuration), and a WCD transmission configuration (e.g., periodicity of a UL signal). As a more specific example, the formula below is provided for calculating the overall extended measurement period for a LTE system:

$$T_{RTOA,E\text{-}UTRAN} = T_{SRS} \times (M-1) \times (n/N) + \Delta \text{ (msec)}$$

The measurement period is for a relative time of arrival (RTOA) measurement made by a measuring node in an eUTRAN radio access network. The measurement is performed on sounding reference signals (SRS). In some cases, a plurality of SRS signals is used over the measurement period. In this context, $T_{RTOA,E\text{-}UTRAN}$ represents the extended measurement period. M represents the number of SRS signals used over the measurement period. $T_{SRS}$ represents a time period between each of a plurality of SRS signals (e.g., 2, 5, 10, 20, 40, 80, 160, or 320 msec). n represents a total number of UL measurements being performed or to be performed per carrier. N represents a minimum number of WCDs that the signal measuring node can measure in parallel. $\Delta$ represents a SRS sampling or processing time.

To further extend the example above, if multiple carriers were supported in parallel, the formula for the extended measurement period may be updated as:

$$T_{RTOA,E\text{-}UTRAN,multi\text{-}carrier} = f(k, T_{RTOA,E\text{-}UTRAN}) \text{ (msec)}$$

In some instances, the above formula is:

$$T_{RTOA,E\text{-}UTRAN,multi\text{-}carrier} = k \times T_{RTOA,E\text{-}UTRAN} \text{ (msec)}$$

Here, k is a scaling factor that depends on the number of carriers measured in parallel. In one example, it may equal the number of carriers measured in parallel by the measuring node.

In step 506, the signal measuring node notifies a measurement management node of the adjustment. The above steps allow the measuring node to avoid being overloaded and to adapt to the measurements in a controlled and predictable manner.

Figure 6:
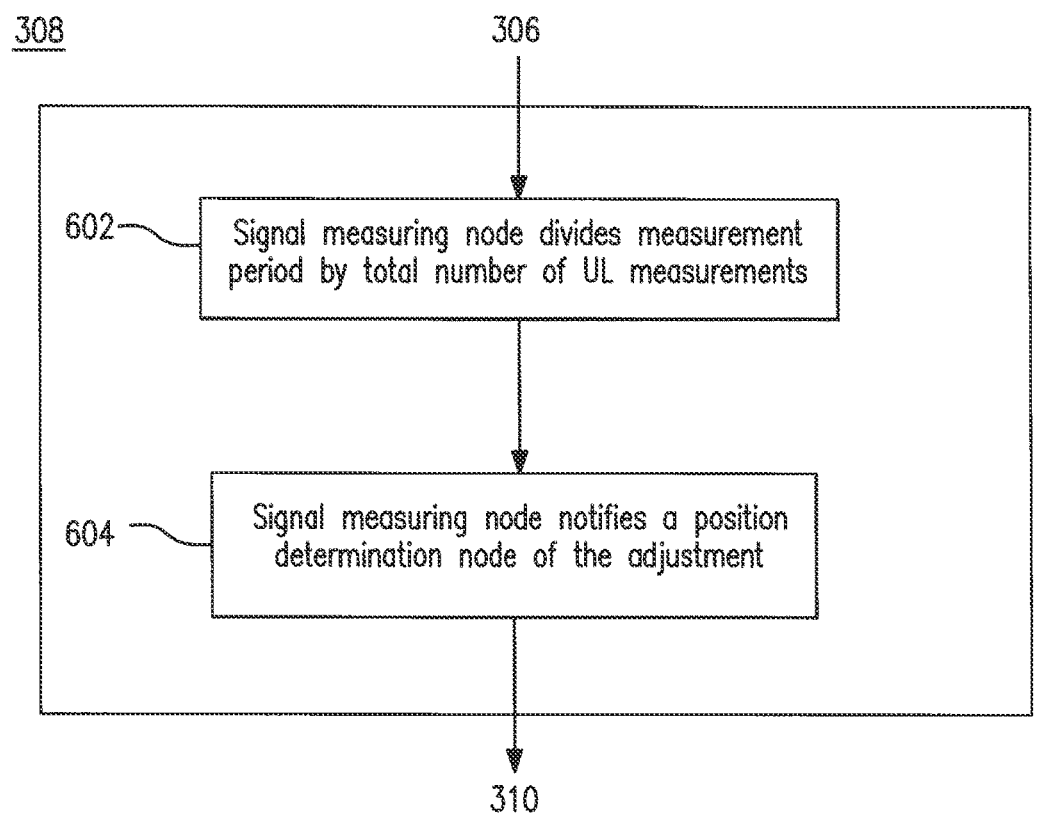

FIG. 6 is a flow diagram that illustrates a more detailed example of the adjusting step 308. These steps may be used in addition to or as an alternative to the adjusting steps illustrated in FIG. 5. In FIG. 6, the signal measuring node adjusts the measurement requirement by adjusting the measurement accuracy. Reducing the measurement accuracy may, for example, allow a greater number of UL measurements to be performed in a measurement period.

In step 602, the signal measuring node divides the measurement period by the total number of UL measurements being performed or to be performed over the measurement period. The total number may have been determined at, for example, step 302. The measurement period may thus be divided into individual measurement periods. In an embodiment, the measurement accuracy is based on the duration of the individual measurement period. A UL measurement may be more accurate with a longer individual measurement period because, for instance, a UL signal being measured was sampled for a longer duration or because the longer duration allowed a more accurate calculation to be performed on the signal. By reducing the individual measurement period, the measuring node may be able to accommodate a greater number of UL measurements.

In some cases, the measurement period being divided may be the extended measurement period determined in step 504. That is, in some cases, the UL measurements being performed or to be performed may still exceed the capability of the measuring node even after the predetermined measurement period has been extended. In such cases, the measuring node may also reduce the measurement accuracy in an effort to accommodate more UL measurements over the measurement period.

While step 604 describes reducing measurement accuracy by reducing an individual measurement period, the measuring node may also or alternatively reduce measurement accuracy by reducing at least one of a number of measurement samples taken for a UL measurement (i.e., an individual sampling count) and a measurement bandwidth used for a UL measurement (i.e., an individual measurement bandwidth).

In an embodiment, the measuring node may determine whether the reduced accuracy is still above a predetermined threshold.

In step 606, similar to step 506, the signal measuring node notifies a measurement management node of the adjustment. For instance, the measuring node notifies the management node of the updated individual measurement period. In an embodiment, a measurement requirement may have to be met under one or more conditions, such as a condition that the UL signals being measured are from at least a certain number of WCDs. Other examples of the conditions are provided later in this disclosure.

Figure 7:
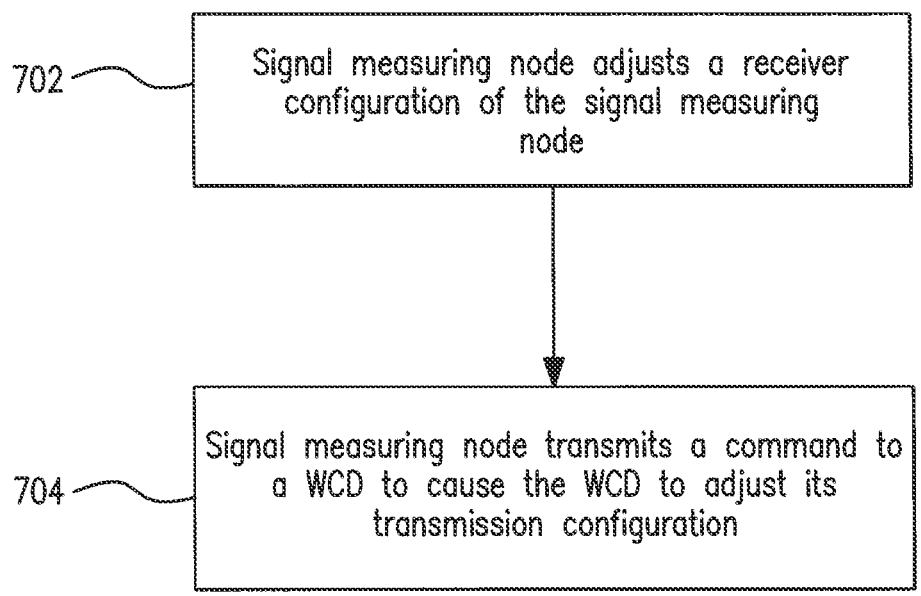

FIG. 7 is a flow diagram illustrating a process in which a measuring node may adjust a receiver configuration of the node or a transmission configuration of a WCD. The steps in FIG. 7 may increase the capability of the measuring node for performing parallel UL measurements. They may be performed in addition to adjusting the measurement requirement, as illustrated in FIG. 3, or as an alternative to adjusting the measurement requirement.

In step 702, the signal measuring node adjusts a receiver configuration of the node to increase an amount of resources allocated to performing UL measurements. In an embodiment, the receiver configuration identifies one or more of: which receivers are activated, which receiver types are activated, which receiver antenna ports or measurement ports are activated, a measurement bandwidth of the receiver, carrier frequency sampled by the antenna, antenna reception scheme, antenna transmission and/or reception mode, carrier schemes used, a measurement period over which the UL measurements are being performed or to be performed, and a number of measurement samples for performing the UL measurements.

Thus, for instance, if the measuring node determines that the total number of UL measurements being performed or to be performed involve too many UL signals to be handled by the antennas activated for UL measurements, the node may adjust the receiver configuration by activating an additional antenna for performing the UL measurements.

In an embodiment, the receiver of the measuring node refers to an antenna, transceiver, or any other wireless receiver.

In step 704, the signal measuring node may cause a WCD that is to be measured to adjust how it transmits UL signals. For example, the measuring node transmits a command to the WCD to cause the WCD to adjust its transmission configuration. In an embodiment, the transmission configuration includes at least one of: carrier frequency of the UL signal, antenna transmission scheme of the UL signal, transmission bandwidth of the UL signal, and number of transmit antennas or antenna ports used by the WCD. As an example, the measuring node may transmit commands to multiple WCDs that are to be measured over the measurement period to cause them to use different transmission carrier frequencies. Such an adjustment to the WCDs' transmission configurations may ensure that UL signals from the WCDs do not interfere with each other when they are received at the measuring node. As another example, the measuring node may support parallel UL measurements only when each WCD transmits UL signals with only one antenna. Thus, the measuring node may transmit commands to one or more WCDs to cause them to adopt, for instance, a 1×2 antenna configuration instead of a 2×2 antenna configuration.

Figure 8:
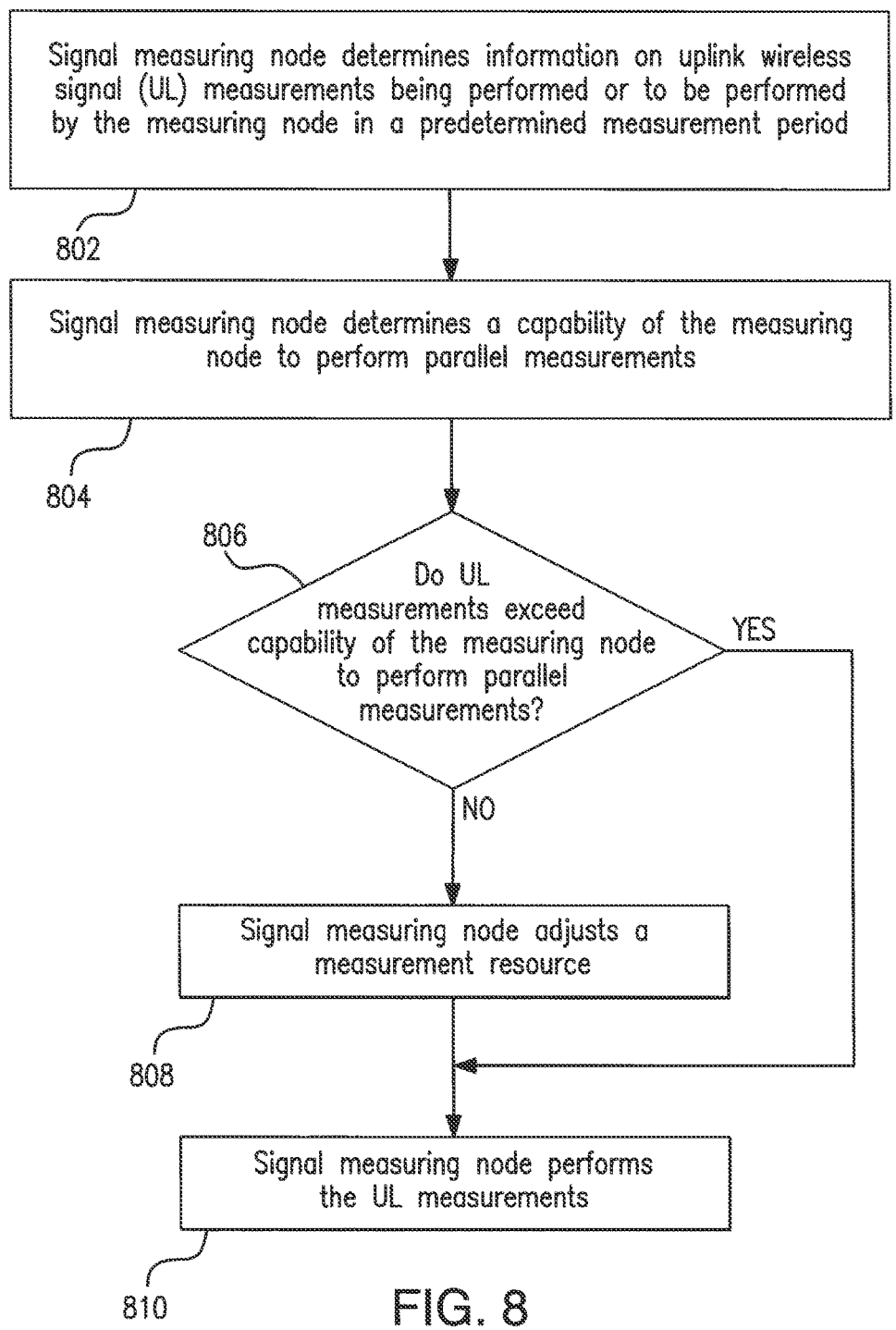

FIG. 8 provides a flow diagram of a process in which a measuring node adjusts a receiver configuration of the node in response to determining that UL measurements being performed or to be performed over a predetermined measurement period exceed the measuring node's capability for performing parallel UL measurements. The process illustrated in FIG. 8 combines steps of FIG. 3 and steps of FIG. 7. In particular, like at step 302, the signal measuring node at step 802 determines information on UL measurements being performed or to be performed by the measuring node over the predetermined measurement period. Like at step 304, the measuring node at step 804 determines the capability of the measuring node for performing parallel measurements. Further, like at step 306, the measuring node determines at step 806 whether the UL measurements being performed or to be performed over the predetermined measurement period exceed the capability of the measurement node to perform parallel measurements.

In step 808, the signal measuring node adjusts a measurement resource of the measuring node in response to determining that the UL measurements exceed the node's capability for performing parallel measurements. The measurement resource may include hardware components such as receivers and processors that perform the UL measurements and power allocated for the UL measurements. Adjusting the measurement resource may include adjusting at least one of: a receiver configuration, a processor configuration, and the amount of power used to perform UL measurements. As discussed above with respect to step 702, adjusting the receiver configuration may include adjusting which receivers of the measuring node are activated, which receiver types are activated, which receiver antenna ports are activated, measurement bandwidth of a receiver, antenna reception scheme, carrier schemes used, or any combination thereof. Adjusting the processor configuration may include allocating more processor resources (e.g., more processors, processor time, or processor power) to UL measurements. The signal measuring node performs the UL measurements in step 812.

Figure 9:
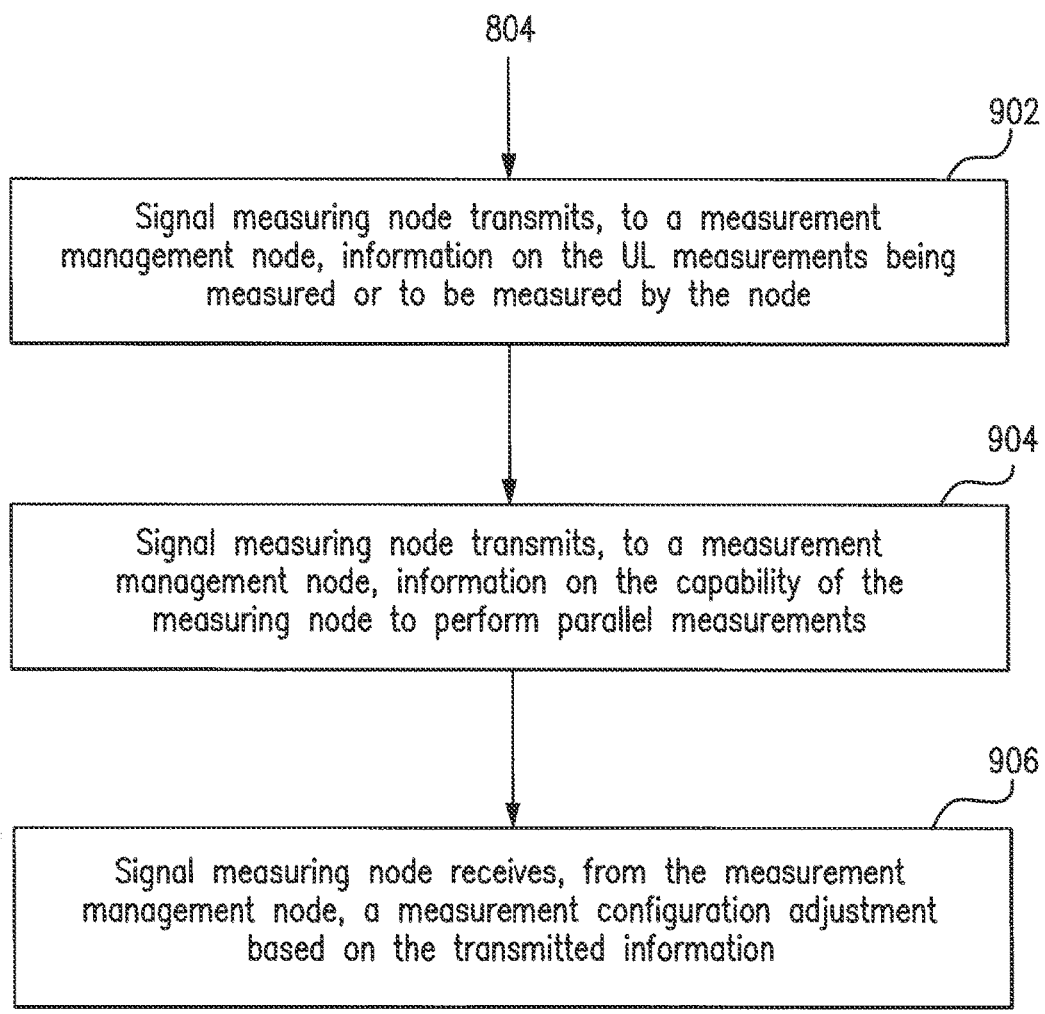

FIG. 9 provides a flow diagram illustrating steps in which the signal measuring node notifies a measurement management node with information relating to UL measurements. The information may allow the management node to assess whether the measuring node is overloaded with UL measurements in a measurement period. The steps may be performed as part of process 800, as illustrated in FIG. 9, or may be performed independently.

In step 902, the measuring node transmits, to the measurement management node, information on the UL measurements being performed or to be performed by the node. In an embodiment, the information includes a total number of UL measurements being performed by the node and UL measurements that have been scheduled or requested at the measuring node. For instance, the measuring node may use a counter to track outstanding UL measurements that the node still has to perform over the measurement period. The measuring node may increment the counter for each UL measurement being scheduled or requested at the node, and may decrement the counter after one of the requested UL measurements has been performed. In this example, the measuring node transmits the value of the counter to the measurement management node. In an embodiment, the measuring node may have multiple counters, with one counter associated with each measurement category. Other information that may be transmitted includes one or more of: number of WCDs that will be transmitting the UL signals to be measured, frequency bands or carrier frequencies of the UL signals, carrier aggregation schemes of the UL signals, bandwidth of the UL signals, and radio access technologies with which the UL signals transmitted.

In step 904, the measuring node transmits, to the measurement management node, information on the capability of the measuring node for performing parallel measurements. In an embodiment, the information includes at least one of: a maximum number of UL measurements that the measuring node is capable of performing over the measurement period, a maximum number of WCDs that the measuring node is capable of receiving UL signals from over the measurement period, and a maximum number of different measurement types supported by the measuring node over the measurement period. In an embodiment, the capability information includes information on the measuring node's receiver configuration or any other information on the resources of the measuring node allocated to performing UL measurements.

In an embodiment, the transmitted information on the capability of the measuring node may include one or more conditions associated with the capability. The one or more conditions may include, for instance:

an indication that the measuring node is capable of adapting its capability based on how the measuring node's resources are used for non-measurement activities;

an indication of an interference condition associated with the capability of the measuring node.

In an embodiment, one or more of the transmitting steps 904 and 906 may be conditioned on a trigger. As an example, transmission of the capability information in step 906 may be triggered when the measuring node is modified (e.g., upgraded with one or more new features) or one or more parameters relating to the UL measurements are changed.

In an embodiment, the information transmitted in step 902 or 904 may be relayed by a third node, such as a base station or another network node.

Figure 10:
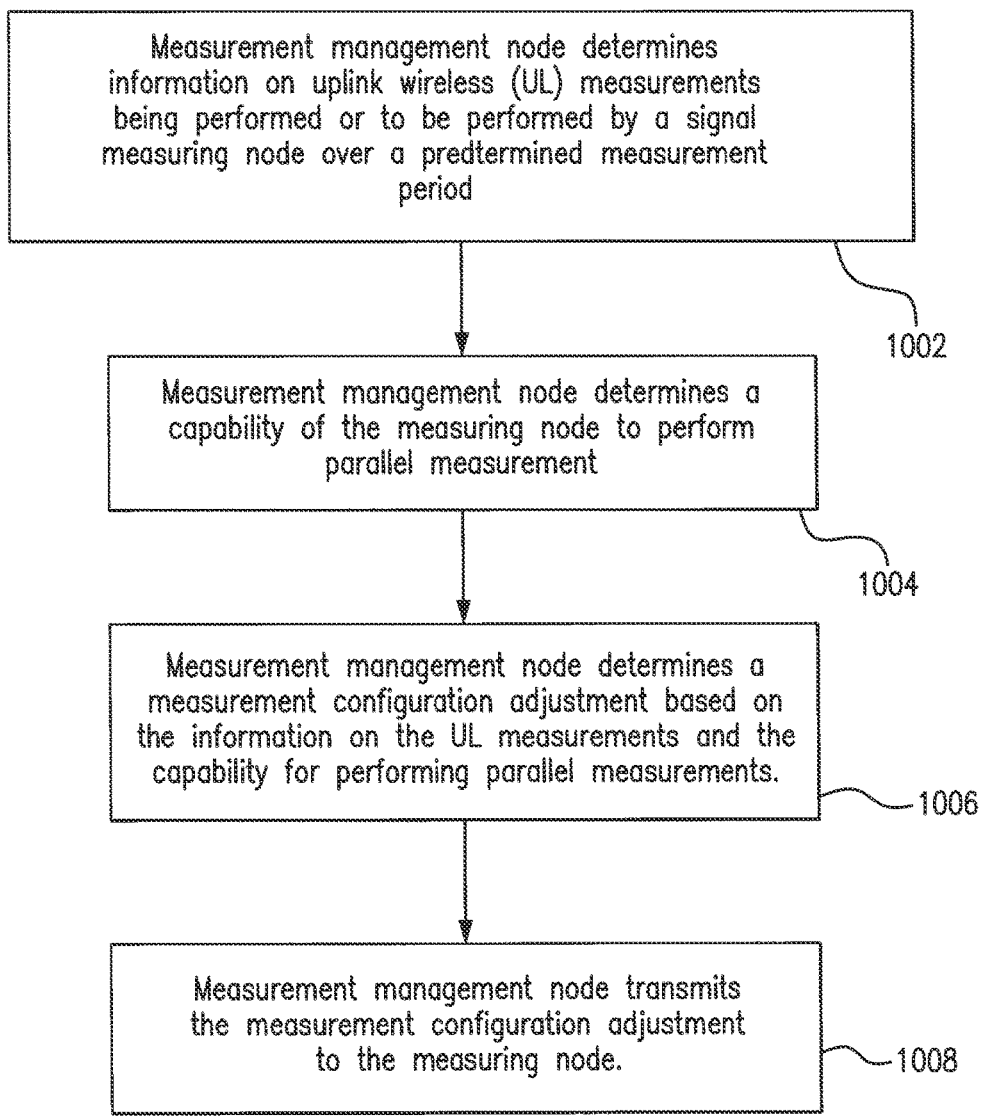

In step 906, the measuring node receives, from the measurement management node, an adjustment to a measurement configuration. The adjustment is based on the transmitted information. This adjustment is discussed in more detail with respect to FIGS. 10 and 11. In general, the adjustment may change the UL measurements being requested or scheduled at the measuring node, which may reduce a measurement load on the measuring node.

FIGS. 10-15 provide flow diagrams illustrating operations from the perspective of the measurement management node. While FIGS. 3-9 illustrate that the measuring node can adjust a measurement requirement, receiver configuration, or WCD transmission configuration, FIGS. 10-15 illustrate that the management node may also make such adjustments. FIGS. 10-15 further illustrate that the management node may adjust a measurement configuration.

In step 1002, the measurement management node determines information on UL measurements being performed or to be performed by a signal measuring node over a predetermined measurement period. For instance, the management node may determine a total number of UL measurements that the measuring node is performing or has to perform over the predetermined measurement period, or a number of UL measurements of a particular measurement category that is being performed or to be performed over the predetermined measurement period. In an embodiment, at least part of this information is received from the measuring node. For example, the information includes the counter value communicated by the measuring node in step 902. In an embodiment, the management node itself has a counter that tracks which UL measurements it has requested at the measuring node and which of those UL measurements have been performed and reported back to the management node.

In step 1004, the measurement management node determines a capability of the measuring node to perform parallel measurements. In an embodiment, at least part of this information is received from the measuring node. In an embodiment, the management node may access a database (e.g., O&M node) or other storage system that stores capability information of measuring nodes. The storage system may be part of a node that aggregated capability information of a plurality of measuring nodes. The capability information is discussed in more detail above with respect to FIG. 3.

In step 1006, the management node determines an adjustment to the measurement configuration based on the information on the UL measurements and the capability of the measuring node for performing parallel measurements. The measurement configuration adjustment is discussed below in more detail with respect to FIG. 11.

In step 1008, the measurement management node transmits the measurement configuration adjustment to the measuring node.

Figure 11:
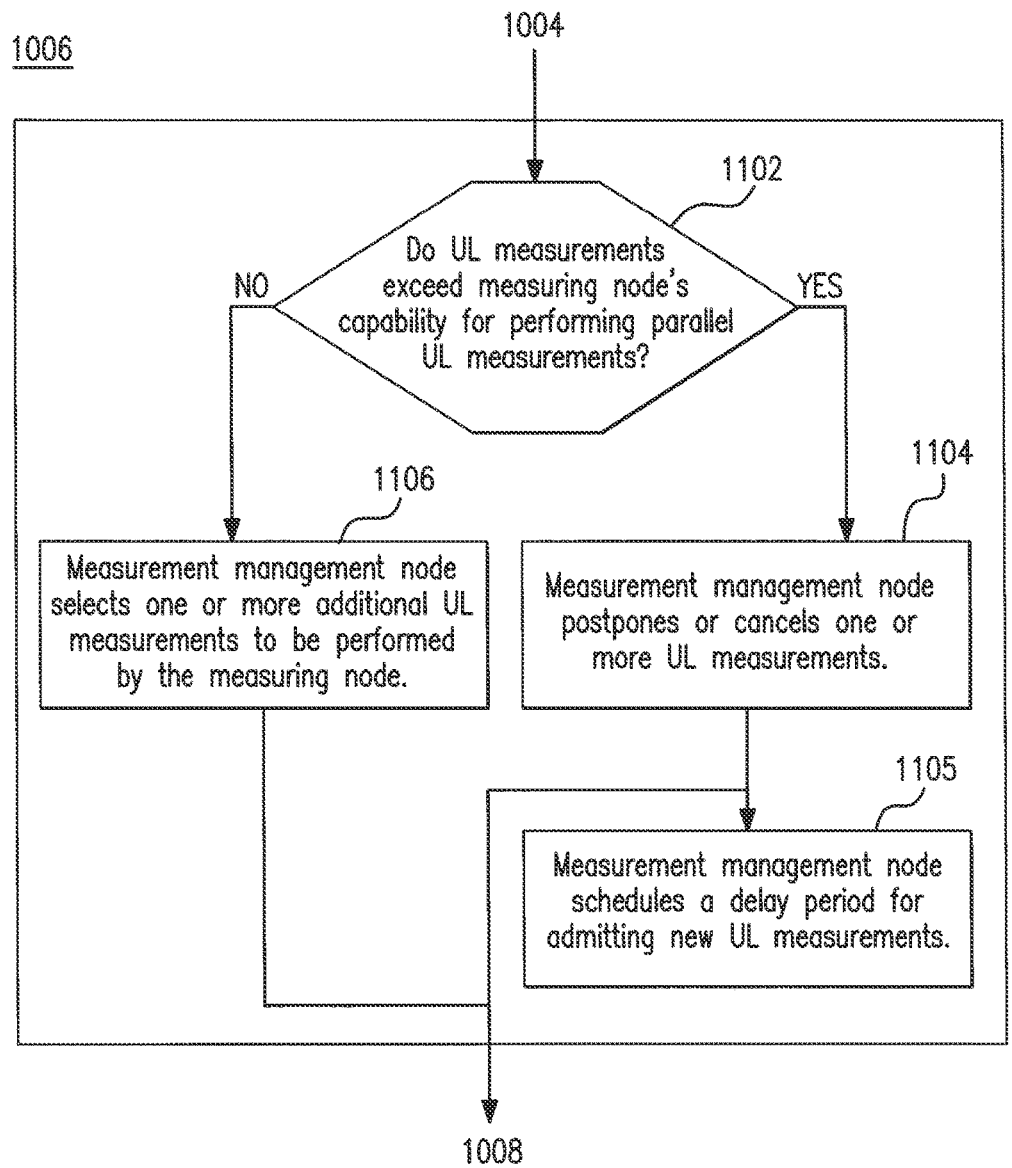

FIG. 11 provides a flow diagram that illustrates a more specific example of the adjusting step 1006. In step 1102, the measurement management node determines whether the UL measurements being performed or to be performed by a measuring node over a predetermined measurement period exceed the measuring node's capability for performing parallel UL measurements.

In step 1104, if the management node determines that the UL measurements do exceed that capability, the management node may adjust the measurement requirement by postponing a UL measurement, or may adjust the measurement configuration by canceling a UL measurement.

In an embodiment, postponing a UL measurement that had been requested or scheduled may involve extending the measurement period, such that the measuring node may delay sending its measurement report for a certain amount of time. Canceling the one or more UL measurements reduces the number of UL measurements that the measuring node has to perform over the predetermined measurement period. In an embodiment, the one or more canceled UL measurements may be distributed to another measuring node. Other adjustments to the measurement configuration include adjusting a parameter of the measurements. In an embodiment, the parameter includes one or more of measurement bandwidth, measurement frequency, and reference signal to be measured.

As discussed above, while step 1102 discusses determining whether the capability of the measuring node has been exceeded by the UL measurements, another embodiment may determine whether the UL measurements are within a threshold amount of exceeding the capability of the measuring node, or may determine whether the UL measurements has exceeded the capability by more than the threshold amount.

In step 1105, the management node may delay or postpone admission of new UL measurements to the measuring node. For instance, if the capability of the measuring node has been exceeded (or, in other embodiments, is nearly exceeded), the management node may wait until a future measurement period to request or schedule new UL measurement requests at the measuring node.

If the management node determines that the UL measurements do not exceed that capability, the management node may actually selects, at step 1106, one or more additional UL measurements to be performed by the measuring node. The one or more additional measurements may be requested or scheduled in step 1008.

Figure 12:
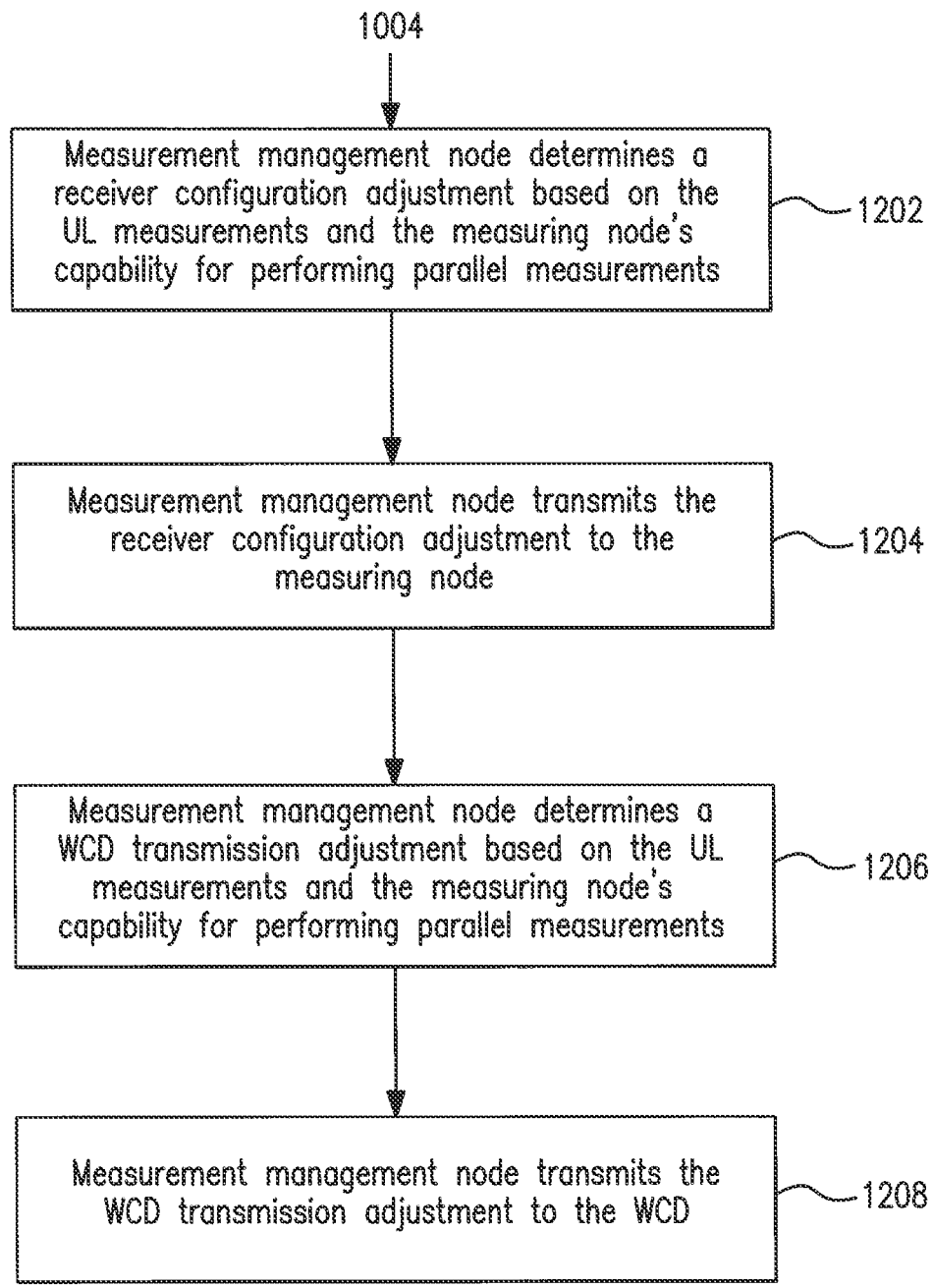

FIG. 12 provides a flow diagram illustrating a process in which the measurement management node adjusts a receiver configuration of the measuring node or a transmission configuration of the WCD.

In step 1202, the measurement management node determines an adjustment to the receiver configuration of the measuring node based on the UL measurements that the measuring node is performing or has to perform over the predetermined measurement period and on the capability of the node for performing parallel measurements. The adjustment step may be similar to the adjustment step in step 808, but is controlled by the management node rather than the measuring node. In step 1204, the management node transmits the receiver configuration adjustment to the measuring node.

In step 1206, the measurement management node determines an adjustment to how a WCD transmits a UL signal to be measured. The adjustment is based on the UL measurements of the measuring node and the measuring node's capability for performing parallel measurements. The adjustment may be similar to that determined by the measuring node in step 704, but is controlled by the management node. In step 1208, the measurement management node transmits the WCD transmission adjustment to the WCD. A base station may relay the transmission to the WCD.

Figure 13A:
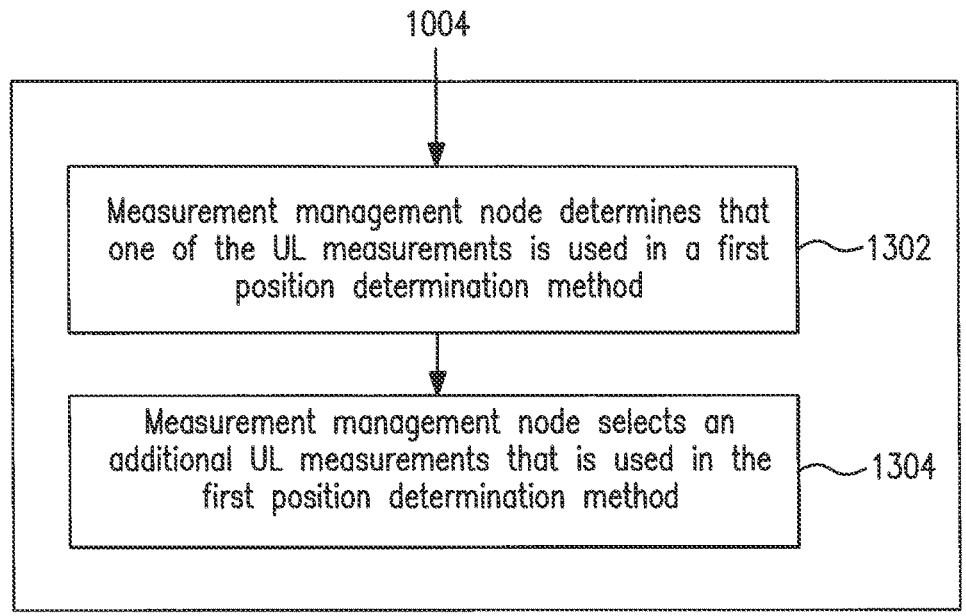
Figure 13B:
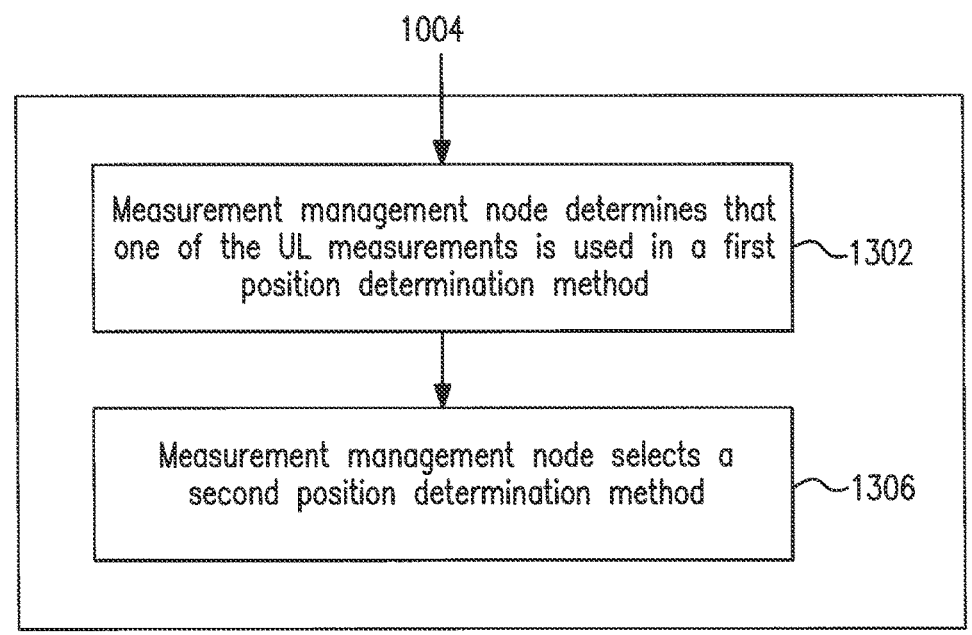

FIGS. 13A-13B provide a flow diagram that illustrates the selection of an additional UL positioning measurement or of a new position determination method based on the capability of the measuring node.

In both figures, the management node is a positioning node and determines, at step 1302, that one of the UL measurements being performed or to be performed is used in a first position determination method, such as the enhanced cell ID (ECID) method. In the example of FIG. 13A, the management node then selects, in step 1304, an additional UL measurement that is also used by the first position determination method. This additional measurement may be complementary to UL measurements already being performed or requested at the measuring node. As an example, the ECID position determination method relies on both a BS Rx–Tx measurement and an AoA measurement. If the management node determines that the measuring node is already performing or has been requested to perform BS Rx–Tx measurements for ten WCDs, it may request or schedule AoA measurements for the remaining WCDs. Selecting UL measurements that are of different measurement types, but that are used by the same position determination method, may balance the types of measurements being performed among various measuring nodes.

In the example of FIG. 13B, the management node selects a second position determination method, particularly in response to a determination that the capability of the measuring node is exceeded by UL measurements. The second position determination method may rely on one or more DL measurements. For instance, if the management node determines that there are no available measuring nodes for performing UL measurements because the capability of each of the nodes for performing parallel measurements has been exceeded, the management node may select a position determination method that uses a DL measurement. Thus, in this example, the management node may switch from a UL-based method such as UTDOA to a DL-based method such as OTDOA.

Figure 14:
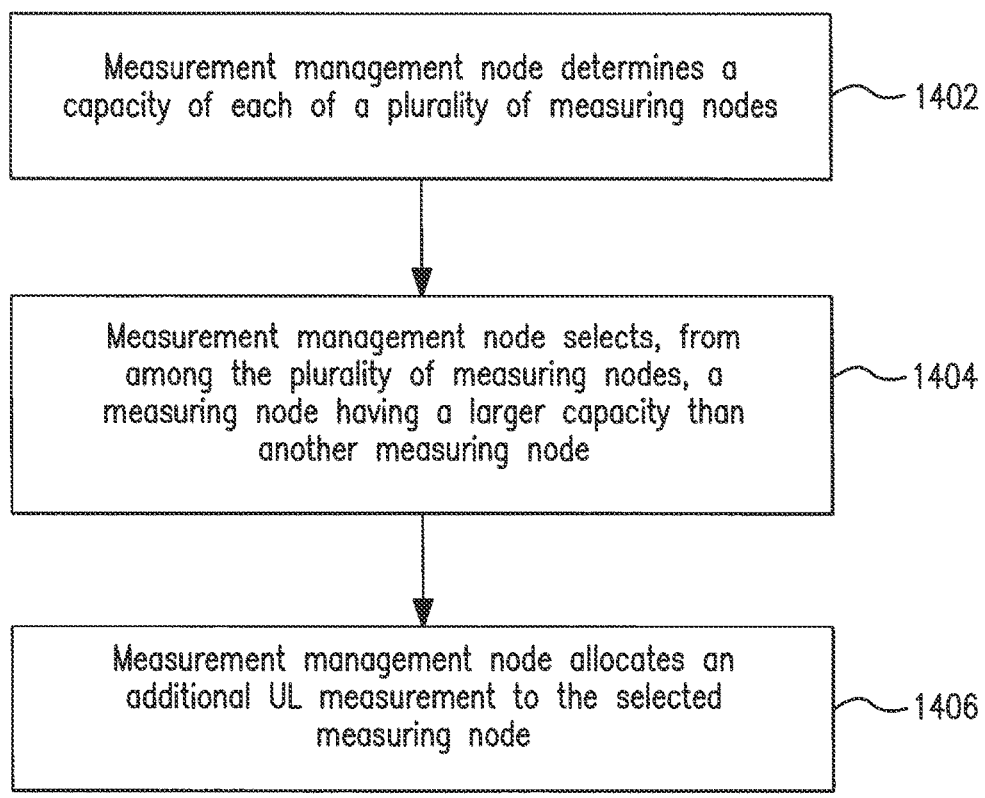

FIG. 14 provides a flow diagram that illustrates load balancing performed by the measurement management node. The load balancing may be performed for a plurality of measuring nodes based on how many UL measurements each measuring node is performing or has to perform over a predetermined measurement period.

In step 1402, the management node determines a capacity of each of the plurality of measuring nodes. The capacity reflects a difference between the measuring node's current measurement load and its capability for performing parallel measurements. For example, it may be calculated by subtracting the maximum number of UL measurements that the measuring node is capable of performing over the measurement period by the total number of UL measurements that the node is performing or has to perform in the period. The difference may represent how many additional UL measurements are supported beyond the measuring node's current load.

In an embodiment, the management node may select from among measuring nodes based on their capabilities, and more specifically based on their capacities. As an example, in step 1404, the management node selects, from among the plurality of measuring nodes, a measuring node having a capacity larger than that of another node. In an embodiment, the management node selects a measuring node having the largest capacity.

In step 1406, as part of load balancing, the measurement management node allocates an additional UL measurement to the selected measuring node, which has a larger capacity compared to another of the plurality of measuring nodes. Thus, in an embodiment, the management node may thus distribute UL measurement requests in a way that evenly balances the requests among a plurality of measuring nodes.

Figure 15:
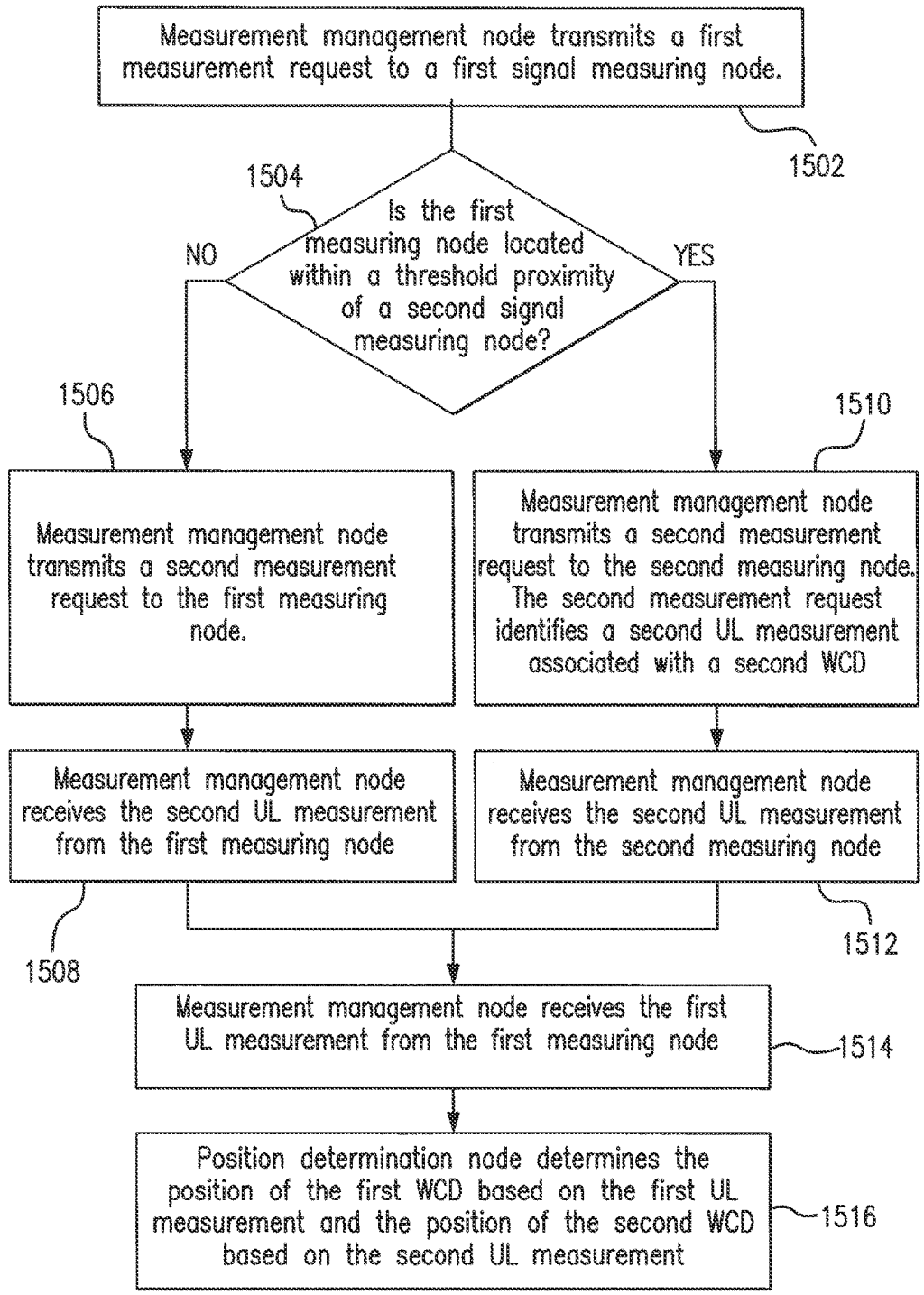

FIG. 15 provides a flow diagram that illustrates a management node distributing UL measurement requests among a plurality of measuring nodes based on a node deployment scenario. The node deployment scenario may indicate whether the plurality of measuring nodes are co-located. In the example of FIG. 15, the management node is a positioning node, and the UL measurements are used for determining a position of a WCD. In a deployment scenario in which the measuring nodes are co-located, the management node may request or schedule fewer UL measurement requests per measuring node.

In step 1502, the management node transmits a first UL measurement request to a first signal measuring node. In an embodiment, the request is associated with a first UL signal that will be transmitted by a first WCD. For example, referring to FIG. 1, measurement management node 120 may transmit a first UL measurement request to signal measuring node 110a. The request may be associated with a UL signal that will be transmitted by WCD 130, and is used for determining a location of WCD 130.

In step 1504, the management node determines whether a second measuring node is within a threshold proximity to the first measuring node. Referring again to FIG. 1 as an example, management node 120 may determine whether signal measuring node 110c is within a threshold proximity (e.g., located at a common base station site) to signal measuring node 110a. The proximity affects the measurement of UL signals from a second WCD, such as WCD 140 in FIG. 1. For instance, if measuring node 110a is not co-located with measuring node 110c, then node 110a has to measure UL signals from both WCD 130 and WCD 140. If, on the other hand, signal measuring node 110a is co-located with measuring node 110c, then the measurements of UL signals from the two WCDs can be divided between node 110a and node 110c. The steps below illustrate this distribution of UL measurements. The determination of whether two nodes are within the threshold proximity may be based on one or more of a) pre-defined information (e.g., a node's identity indicating link to a location; b) an express indication from one of the nodes (e.g., indicating all nodes co-located with it); c) indication from a WCD (e.g., if the WCD is aware of how the measuring nodes are deployed); d) indication from a network node (e.g., OSS node, O&M node, SON node, core network node), and e) indication of whether one of the nodes is integrated with a base station or other access point.

In step 1506, in response to determining that the two measuring nodes are not within the threshold proximity of each other, the measurement management node transmits a second measurement request to the first measuring node. The second request is associated with a UL signal that a second WCD will transmit, and is used to determine a position of the second WCD. In step 1508, the measurement management node receives a UL measurement corresponding to the second request from the first measuring node.

In step 1510, in response to determining that the two signal measuring nodes are within the threshold proximity of each other, the management node transmits the second measurement request to the second measuring node. This step still results in two UL measurement requests, but results in fewer requests per measuring node. At step 1512, the management node receives a UL measurement corresponding to the second request from the second measuring node.

In step 1514, the management node receives the first UL measurement from the first measuring node.

In step 1516, the measurement management node determines the position of the first WCD based on the UL measurement of the first request and determines the position of the second WCD based on the UL measurement of the second request.

In general, two measuring nodes may be said to be in a co-existence scenario. If the two nodes further share a common site, such that they are within a threshold proximity of each other, then they may be considered to be co-located. In some scenarios, the two co-located measuring nodes may further share radio equipment. Measuring nodes in such scenarios are referred to as being co-sited.

In both co-located and co-existence scenarios, a wireless communications system may be a victim or an aggressor system. A victim or an aggressor system may include all or a subset of radio nodes of a telecommunications network, or include all or a subset of WCDs of the telecommunications network.

In addition to the UL measurement descriptions provided above, more detailed aspects of the UL measurements are described below.

UL Radio Signal

The discussion above describes measurements being performed on a UL radio signal ("UL signal" or "UL transmission"). A UL signal generally refers to any radio signal transmission by a WCD. The transmission may be a dedicated transmission or a transmission directed toward a specific node (e.g., eNodeB, LMU, another WCD, relay, repeater, etc.) or may be a multicast or a broadcast transmission from the wireless device. In some instances, an UL transmission may even be a peer-to-peer transmission. The transmission may come from a WCD and may be in a frequency spectrum (e.g., frequency band or carrier frequency) intended for UL transmissions.

Some examples of UL radio signals are reference signals transmitted by the WCD (e.g., SRS signal or demodulation reference signal transmitted in UL), dedicated or shared channel signal transmitted by the WCD (e.g., a signal in a data channel, control channel, random access channel, a broadcast channel, etc.), or other physical signals (e.g., a beacon signal or message transmitted by the WCD for device-to-device communication, neighbor discovery, or presence/activity indication). In an embodiment, UL radio signals are configured specifically for position determination.

Radio Signal Measurements

The uplink (UL), downlink (DL), and other radio signal measurements described herein are performed by radio nodes (discussed in more detail below) on received radio signals. As discussed above, such measurements may be performed for various purposes. In LTE, they may be performed for radio resource management (RRM), mobility management, position determination, SON implementation, MDT implementation, or any other purpose. The same measurement may be performed for only one purpose or may be performed for multiple purposes.

In some instances, measurements may be pattern-based measurements, such as measurements performed according to a certain time and/or frequency pattern (e.g., measurement gap pattern, time-domain measurement resource restriction pattern for DL and/or UL measurements, measurement cycle pattern for measurements on secondary cells (Scells) within a carrier aggregation (CA) scheme, etc.). The measurements may also be performed over a certain bandwidth. For example, they may include a wideband reference signal received quality (RSRQ) measurement or a measurement performed over a configured measurement bandwidth that is smaller than the system bandwidth. The measurements may be performed with or without carrier aggregation (CA).

In LTE, measurements may be classified as physical-layer measurements, layer 2 measurements, or any combination thereof (see TS 36.214 and TS 36.314 for more details). Measurements may also be classified as intra-frequency measurements, inter-frequency measurements, intra-RAT measurements, inter-RAT measurements, intra-band measurements, inter-band measurements, or any combination thereof.

UL Measurement

The "UL measurement" discussed above refers to a measurement performed on one or more UL radio signals. In general, an UL measurement is a measurement involving at least one UL component. As an example, the UL measurement includes at least one of a physical-layer measurement and a physical channel reception measurement. An UL measurement may involve one or more radio signal samples. Different samples may correspond to different time and/or frequency resources.

In LTE, the uplink transmission takes place using a multiple access scheme called as Single-Carrier Frequency Division Multiple Access (SC-FDMA) with a cyclic prefix in the uplink. The SC-FDMA can be viewed as a special case of OFDMA. More specifically it is called DFTS-OFDM. The OFDMA which is used in the DL or any other variant of OFDMA can also be specified for the UL transmission in LTE.

In an embodiment, a UL measurement may be a timing measurement, a power-based measurement, a direction measurement, or any combination thereof. It may be performed for any purpose. Some UL measurements involve at least one UL component, are a measurement on multifarious links, and are a composite measurement. Some more specific examples include at least one of: an uplink time difference of arrival (UL TDOA) or time of arrival (TOA) measurement, an uplink angle of arrival (UL AoA) measurement, a WCD receiver–transmitter timing difference (WCD Rx–Tx) measurement, a measuring node receiver–transmitter timing difference (measuring node Rx–Tx) measurement, UL received signal strength or quality measurement, UL path-loss measurement, and any measurement described in 3GPP TS 36.214. The measurement with at least one UL component may involve radio links between two or more radio nodes, e.g., three radio nodes may be involved with multifarious links or TDOA measurements, and the radio links may or may not be on the same frequency, same carrier aggregation scheme, same frequency band, or same radio access technology (RAT).

In an embodiment, an UL measurement may include a higher-layer measurement (e.g., a layer two (L2) measurement) based on information received from another node or another layer in the same node. A higher-layer measurement may comprise, in an example, an estimation of the performance of a data flow received by the node.

Conditions Accompanying Measurement Requirement

As discussed above, a measurement requirement may have to be met under one or more conditions, examples of which include one or more of the following:

1. At least a certain number of UL transmissions (e.g., number of SRS transmissions) are used for UL positioning measurement for a WCD;
2. While the UL measurements are being performed, at least a certain number of WCDs are being configured to transmit additional UL signals;
3. A measuring node performs UL positioning measurements for at least a certain number of wireless devices in parallel;
4. At most a certain number of UL signals (e.g., number of SRS transmissions) are not transmitted by the wireless device;
5. The maximum output power per transmit antenna is at least above a threshold (e.g., 17 dBm per antenna);
6. Time misalignment between UL signals transmitted by any two transmit antennas of a WCD (assuming it has more than one antenna) is within a threshold (e.g., ±200 ns);
7. The absolute transmit power difference between signals transmitted by any two transmit antennas of the wireless device is within a threshold (e.g., 6 dB);
8. The phase discontinuity of signals transmitted when multiple transmit antennas of the WCD is used is within a threshold (e.g., ±30 degrees);
9. The number of CA configuration updates or carrier activations/deactivations of the transmitting node does not occur at all or does not occur more that N times during the UL measurement being performed.

The measurement requirement and accompanying conditions may, in some instances, be different a) for different interference conditions; b) for different bandwidth configurations or UL signal (e.g., SRS) configurations; c) when different UL signals are used for performing UL measurements (e.g., SRS and PUSCH); d) when a WCD is configured with CA versus without CA; e) when a measuring node is capable of measuring with SCells versus when it is not; f) when a WCD is configured with CoMP/multiflow transmission with CA versus when it is configured without CA; g) when the measuring node performs measurements on R1 and R2 carriers concurrently for the same WCD versus for different WCDs (e.g., R1=1 and R2>1); h) for different RATs; i) for different duplex mode configuration (e.g., for FDD and TDD or for FDD and HD-FDD); and/or k) for different wireless device categories.

Positioning Measurements

In an embodiment, the UL measurement is a positioning measurement. The terms "UL measurements used for positioning," "measurements used for UL positioning," and "UL positioning measurements" may be used interchangeably. UL positioning measurements may include any radio measurement configured for determining a position of a node, either as the sole purpose or a partial purpose of the measurement. Some specific examples of UL positioning measurements include a UTDOA measurement, a UL RTOA measurement, UL TOA measurement, UL TDOA measurement, UL AoA measurement, UL power-based measurement (e.g., UL received signal quality or UL received signal strength measurement), UL propagation delay measurement, a two-directional measurement involving an UL measurement component (e.g., RTT, eNodeB Rx–Tx, or UE Rx–Tx), or any combination thereof.

In an embodiment, UTDOA measurements and UL RTOA measurements are performed on Sounding Reference Signals (SRS). To detect a SRS signal, a measuring node needs a number of SRS parameters to generate the SRS sequence which is to be correlated with received signals. The SRS parameters used for generating the SRS sequence and determining when SRS transmissions occur may be provided in assistance data from a measurement management node (e.g., a positioning node). In a LTE system, the assistance data may be provided via an interface such as SLmAP. However, in some instances, the measurement management node may not know such parameters. In such instances, the measurement management node may obtain information for those parameters from a base station configuring the SRS to be transmitted by the WCD. In LTE, this information may be provided from the base station to the management node (e.g., e-SMLC) via the LPPa interface.

In some instances, in determining a position of a WCD, a plurality of UL timing measurements (e.g., Rx–Tx time difference, timing advance, or RSTD) on UL signals from the WCD, each measurement by a different measuring node, may be used by a measurement management node to calculate a position of a WCD.

In some instances, a plurality of mobility-related measurements (e.g., RSRP or RSRQ), each from a different measuring node, may be used to triangulate a position of a WCD that transmitted the measured UL signal. Other UL positioning measurements, such as a UL signal's angle of arrival (AoA), may be used independently or in combination with the above measurements.

RRM and Mobility Measurements

Examples of RRM or mobility-related measurements in LTE include a measurement of UL signal's reference signal received power (RSRP) or the UL signal's reference signal received quality (RSRQ).

Examples of mobility-related measurements in UMTS include a measurement of a UL signal's UTRAN common pilot channel (CPICH) received signal coded power (RSCP), or UTRAN CPICH Ec/No.

Examples of mobility-related measurements in other radio access technologies include a measurement of a signal's GSM carrier signal received signal strength indicator (RSSI) (in GSM systems), or a UL signal's pilot strength (in CDMA 2000 or HRPD systems).

The UL measurements described above may be performed as intra-RAT mobility measurements, in which case they correspond to the same RAT, or may be performed as inter-RAT mobility measurements, in which case they correspond to different RATs.

Timing Measurements

Examples of timing-related measurements include a measurement of a signal's round-trip time (RTT), time of arrival (TOA), uplink relative time of arrival (UL RTOA), time difference of arrival (TDOA), reference signal time difference (RSTD), WCD Receiver–Transmitter (Rx–Tx) time difference, base station Rx–Tx time difference, SFN-SFN timing, one-way propagation delay, or time advance.

Parallel Measurements

As discussed above, the term "parallel measurements" may refer to multiple measurements being performed or to be performed over a predetermined measurement period. The measurements may include one or more of: radio measurements, radio channel receptions, and other-layer (e.g. Layer 2) measurements. Any combination of the measurements may be referred to as parallel measurements.

In some instances, multiple measurements may be performed on the same radio signal, but may be performed for different purposes. For example, one measurement may involve a first calculation on the radio signal, while another measurement may involve a different calculation on the radio signal.

Examples of parallel UL measurements are provided below. The examples are provided only for illustration purposes and are not intended to be limiting:

Example 1: two or more UL measurements performed on UL radio signals transmitted by the same WCD, wherein
  i. the UL radio signals used by the UL measurements may be the same set of UL signals or different sets of UL signals, and/or
  ii. the UL radio signals may be transmitted and/or measured on the same time and/or frequency resources or different time and/or frequency resources. Two sets of signals or resources may be different even if there is a degree of overlap between them.

Example 2: two or more UL measurements performed on UL radio signals transmitted by different WCDs, wherein
  i. the different WCDs are served by the same serving base station (e.g., eNodeB in LTE),
  ii. the different WCDs are served by different base stations, and/or
  iii. the transmissions of the different WCDs may be using the same or different (i.e., partly overlapping or non-overlapping) time and/or frequency resources.

Example 3: two or more UL measurements performed on different types of UL signals, such as
  i. a measurement on a SRS signal and another measurement on a demodulation reference signal Example 4: two or more UL measurements are the same-type of UL measurement, configured with at least one parameter which is different for the two or more measurements, wherein
  i. the different parameters include different UL radio signal sequences or different values for generating a sequence (e.g., different physical layer cell identity (PCI) or pseudo-random number, etc.), different configuration index, different time and/or frequency resources, different bandwidth, different transmission periodicity, different measurement time, or any combination thereof. Some examples of the two or more UL measurements include two base station (BS) Rx–Tx time difference measurements with different reporting periodicity and/or with different measurement bandwidth.

Example 5: two or more UL measurements of different measurement types, such as
  i. a BS Rx–Tx time difference measurement and a timing advance (TA) measurement, UL RTOA measurement, AoA measurement, rise over thermal (RoT) measurement, or received interference power (RIP) measurement.

Example 6: two or more UL measurements having the same frequency, same component carrier (CC), same RAT, or same frequency band Example 7: two or more UL measurements where at least one of frequency, CC, RAT, and frequency band is different Example 8: two or more UL measurements performed on radio signals received on the same receiver antenna or the same receiver antenna port Example 9: two or more UL measurements associated with different measurement requests or measurement configurations, such as one measurement in which at least one of measurement bandwidth, time period, and/or reference signal (e.g., SRS or DMRS) is specified in a first measurement configuration and another measurement in which a different measurement bandwidth, time period, and/or reference signal is specified in a second measurement configuration.

Example 10: two or more UL measurements associated with different services or internal functions (different location-based services (LBS); a positioning service versus a voice call service; a positioning service versus a synchronization service, where the latter is an internal measuring node's function; positioning measurements; and mobility measurement versus a general RRM measurement)

Example 11: two or more UL measurements associated with the same or different layers (e.g., only physical layer measurement and one Layer 2 measurement).

Example 12: two or more UL measurements having different carrier aggregation (CA) types. The CA types include intra-band contiguous CA, intra-band non-contiguous CA, inter-band CA, inter-RAT CA, or any combination thereof.

Example 13: two or more UL measurements associated with different types of supported CA on which UL parallel measurements can be performed. For example, the UL measurements may differ in number of CCs used in a CA scheme, bandwidth of the CCs, band or frequency combination of the CCs, or any combination thereof.

Example 14: two or more UL measurements associated with different receiver activity states, such as a measurement to be made in discontinuous reception (DRX) mode and another measurement to be made in a non-DRX mode, or two measurements both made in the DRX mode, but with other configurations (e.g., periodicity) that are different.

Example 15: two or more UL measurements associated with different activation states of secondary serving cells (SCells). More parallel measurements can be performed in a measurement period if SCells are activated, because UL signals transmitted by the WCD is available more frequently for UL measurements.

Example 16: two or more UL measurements associated with a specific receiver RF configuration Example 17: two or more UL measurements associated with a same or different uplink antenna schemes. The schemes specify, for example, single transmit antenna scheme, multiple transmit antenna scheme, number of UL antennas, UL transmit diversity, UL MIMO (spatial diversity, beamforming, etc), open loop Tx diversity, closed loop transmit diversity, or any combination thereof.

Example 18: two more UL parallel measurements performed for positioning (e.g., BS Rx–Tx time difference measurement, TA measurement, AoA measurement, etc.).

Example 19: two or more UL parallel measurements performed for interference mitigation (e.g. SINR measurement, RIP measurement, RoT measurement, etc.)

Example 20: two or more UL parallel measurements performed for admission control or for mobility (e.g. UL resource block usage measurement, transport network load measurement, etc.)

Example 21: two or more UL parallel measurements performed for non-positioning purpose (e.g. SINR, RIP, RoT, one way propagation delay measurement, etc.)

WCD Requirement Testing

In an embodiment, testing may be performed to ensure compliance with measurement requirements. In the context of DL measurements, different types of WCD and measurement requirements may be specified. To ensure that a WCD meets these requirements, appropriate and relevant test cases are specified. During the tests all the downlink radio resources are not typically needed for a device under test. In practical circumstances several devices receive transmission simultaneously on different resources in a cell. To make the tests as realistic as possible, these remaining channels or radio resources should be transmitted in a manner that mimics transmission to other user devices in a cell.

The objective of WCD performance verification (e.g., UE performance tests) is to verify that a WCD fulfils the desired performance requirements in a given scenario, condition, and channel environment. A desired performance requirement refers to a requirement specified in the standard or requested by an operator or by any prospective customer. The performance requirements span a very vast area of WCD requirements, including the following examples:

1. WCD RF receiver requirements (e.g., WCD receiver sensitivity),
2. WCD RF transmitter requirements (e.g., WCD transmit power accuracy),
3. WCD demodulation requirements (e.g., achievable throughput),
4. Radio node RF receiver requirements (e.g., for relays),
5. Radio node RF transmitter requirements (e.g., for relays),
6. Radio resource management requirements (e.g., handover delay).

In an embodiment, the WCD verification can be classified into two categories: a) Verification in the lab, and b) Verification in a real network.

Verification in Lab

In verifying a WCD in the lab, the base station is emulated by test equipment (e.g., a system simulator). Thus all downlink transmission is done by the test equipment to the test WCD. During a test, the test equipment may transmit over all common and other necessary WCD-specific control channels. In addition, a data channel (e.g. PDSCH in E-UTRAN) may also be needed to send necessary data and configure the WCD. Further, typically a single WCD is tested at a time. In most typical test cases the entire available downlink resources are not used by the WCD. However, to make the test realistic, the remaining downlink resources should also be transmitted to one or multiple virtual user devices.

In OFDMA systems, the transmission resources comprise time-frequency resources called resource blocks, which are sent with some transmit power level. This type of resource allocation to generate load in OFDMA will be referred to as OFDM channel noise generation (OCNG). OCNG may be applied to a plurality of virtual user devices for loading the cell.

Verification in Real Network

The tests described below may be desired by operators wanting to perform verification for a real network. The tests may apply to a single WCD or multiple WCDs. Prior to the network roll out or in an early phase of deployment, the traffic load is typically very low. In classical tests, the cell load is generated by increasing transmission power on one or more common channels. However operators are now increasingly asking network vendors to generate cell load in realistic fashion for performing tests. This means resources which are not allocated to the test user devices should be allocated to the virtual user devices to emulate load in the cell. Thus either all or large part of available resources (e.g., channels, transmit power, etc.) is used in the tests. This requires base station to implement the ability to transmit remaining resources in order to generate load. For OFDMA (e.g., OFDMA in E-UTRAN), OCNG is deemed to be implemented in an actual base station.

Noise Generation in WCDMA for WCD Performance Verification

In WCDMA, orthogonal channel noise simulator (OCNS) is used to load cells in the test. The OCNS may be implemented in both test equipment and the base station. In the former case it is standardized in TS 25.101 and TS 25.133 for each type of test, or is the same for similar tests. The OCNS comprises channelization code and relative power. In a CDMA system, the position of channelization code in a code tree is sensitive to intra-cell interference. Therefore, more careful selection of codes for OCNS and their power levels is needed. An example of OCNS from TS 25.101 for WCD demodulation tests is provided below:

Example: DPCH Channelization Code and Relative Level Settings for OCNS Signal

| Channelization Code at SF = 128 | Relative Level setting (dB) (Note 1) | DPCH Data (see NOTE 3) |
|---|---|---|
| 2 | −1 | The DPCH data for each channelization code shall be uncorrelated with each other and with any wanted signal over the period of any measurement. For OCNS with transmit diversity the DPCH data sent to each antenna shall be either STTD encoded or generated from uncorrelated sources |
| 11 | −3 | |
| 17 | −3 | |
| 23 | −5 | |
| 31 | −2 | |
| 38 | −4 | |
| 47 | −8 | |
| 55 | −7 | |
| 62 | −4 | |
| 69 | −6 | |
| 78 | −5 | |
| 85 | −9 | |
| 94 | −10 | |
| 125 | −8 | |
| 113 | −6 | |
| 119 | 0 | |

NOTE 1:
The relative level settng specified in dB refers only to the relationship between the OCNS channels. The level of the OCNS channels relative to the $\text{I}_{or}$ of the complete signal is a function of the power of the other channels in the signal with the intenton that the power of the group of OCNS channels is used to make the total signal add up to 1.
NOTE 2:
The DPCH Channelization Codes and relative level settings are chosen to simulate a signal with realistic Peak to Average Ratio.
NOTE 3:
For MBSFN, the group of OCNS channels represent orthogonal S-CCPCH channels instead of DPCH. Transmit diversity is not applicable to MBSFN which excludes STTD.

Generating Interference for Testing of Parallel UL Measurements

In addition to the general testing described above, tests may be performed to verify that a measuring node is capable of meeting a declared capability for performing parallel measurements. The testing may further more specifically verify whether the measuring node can perform UL measurements on UL signals from the same or different WCDs in parallel.

Figure 16:
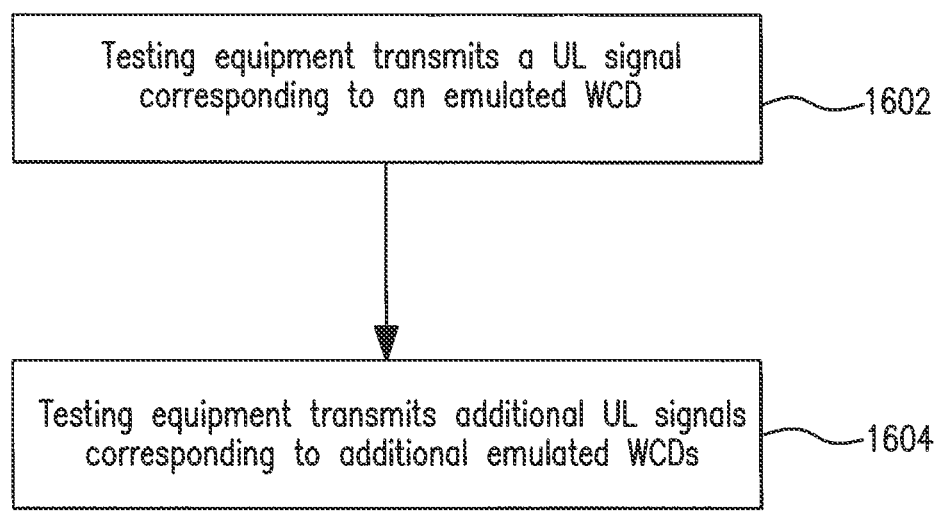

FIG. 16 provides a flow diagram that illustrates a testing process in which testing equipment emulates WCDs that are transmitting UL signals to be measured. In an embodiment, one or more transmit signal patterns are generated to mimic transmission from multiple WCDs, and more specifically an environment in which there is UL interference and noise. This ensures that the tests are done in more realistic radio conditions. The patterns can be used in a lab to verify the measuring node's capability for performing parallel UL measurements, or can be used in the field to verify the measuring node's said capability.

In step 1602, the testing equipment transmits a UL signal corresponding to an emulated WCD. In one example, certain UL resources (e.g. UL RBs, UL resource elements, UL carriers or bands, etc.) are assigned to emulate WCDs on which the measuring node performs the UL measurements in parallel.

In step 1604, the testing equipment transmits additional UL signals corresponding to additional emulated WCDs. For instances, the remaining UL resources not assigned at step 1602 are assigned to virtual WCDs in the form of a pattern of UL signals to be transmitted with a pre-defined format. Examples of a pre-defined format include certain pre-defined modulation and coding schemes (e.g. QPSK, convolutional code with code rate of 1/3, etc.). The virtual WCDs may carry data over the assigned resources. The data may contain random or pseudo-random sequences. The virtual WCDs may also transmit with certain pre-defined power level (e.g., maximum output power), with certain UL antenna schemes (e.g., always with 1 Tx or with Tx if the measuring node supports parallel UL measurements on signals transmitted from multiple Tx antennas). The transport format, random sequence, transmit power level, antenna mode or scheme, etc., may depend upon the type of parallel UL measurements which are to be verified.

In an embodiment, the virtual WCDs may transmit using SC-FDMA with a cyclic prefix in the uplink. In an embodiment, the virtual WCDs may transmit using any other variant of OFMA or OFDMA. The transmitted pattern can be called, for example, SCNG (SC-FDMA noise generator).

In an embodiment, the virtual WCDs may transmit UL physical reference signals of the same or different types. An example of the physical reference signal is SRS or a UL demodulation reference signal. The signal may be associated with any one or more of: a certain C-RNTI, PCI, time, and/or frequency resource, a transmission periodicity, a power level (which may be the same or different from that used for PUSCH or PUCCH), SRS cyclic shift, SRS configuration index, duplex configuration, CP configuration, frequency hopping activation state, UE specific SRS bandwidth, cell-specific SRS bandwidth, number of transmit and/or number of receive antenna ports, group hopping pattern, SRS sequence hopping, or any combination thereof.

In some cases, the physical reference signals generated for the simulating UL interference may be cell-specific, while the physical reference transmission configuration for the measured WCD may be WCD-specific.

In an embodiment, one or more transmissions associated with the generated interference pattern may be associated with a specific reference channel configuration. The reference channel may be defined for the purpose of performance evaluation of a measuring node with or without configuring parallel UL measurements.

In an embodiment, the testing may be measurement-specific and/or capability-dependent. For a measuring node, the testing equipment may be configured to receive measurement results from a measuring node and to analyze the received results. Analyzing the received results may involve, for example, comparing the measurement result or the statistics of the measurement results (e.g., with 90% confidence) obtained in the test with reference results to determine whether the measuring node is compliant with performance requirements.

Radio Nodes

As discussed above, a signal measuring node may be a radio node performing measurements on radio signals. A radio node refers to a device with an ability to transmit and/or receive radio signals. In an embodiment, the radio node includes at least a transmitting or receiving antenna. It may include both a WCD and a base station, as well as a relay, a mobile relay, remote radio unit (RRU), remote radio head (RRH), a sensor, a beacon device, a measurement unit (e.g., LMU), user terminal, PDA, mobile phone, smartphone, laptop, etc.

Radio Network Node

In some instances, at least one of the WCD and signal measuring node may be a radio network node. A radio network node is a radio node in a radio communications network and typically characterized by its own or associated network address. For example, mobile equipment in a cellular network may have no network address, but a wireless device involved in an ad hoc network may have a network address. A radio network node may be capable of processing radio signals, receiving radio signals, and/or transmitting radio signals in one or more frequencies. It may operate in single-RAT, multi-RAT, or multi-standard mode (e.g., operate with at least one of WiFi™, LTE, HSPA, and LTE/LTE-A).

Some specific examples of a radio network node may include at least one of a NodeB, eNodeB, RRH, RRU, and a transmitting-only/receiving-only node. The radio network node may or may not create its own cell. It may share a cell with another radio node, which may have created a cell. More than one cell may be associated with a radio node. In an embodiment, it has at least one of a transmitter or transmitting antenna and a receiver or receiving antenna. In some cases, the antennas are not co-located. The radio network may be configured with one or more serving cells as part of a carrier aggregation scheme. For example, if the radio network node were a WCD, it may be provided with a Primary Cell (Pcell) and a Secondary Cell (Scell) of a carrier aggregation scheme.

Network Node

In some instances, the measurement management node may be a network node. A network node may be any radio network node or, in LTE or UMTS, a core network node. Some non-limiting examples of a network node include one or more of an eNodeB, RNC, positioning node, MME, PSAP, SON node, MDT node, coordinating node, and O&M node.

Positioning Node

As discussed above, the measurement management node may be a positioning node. A positioning node is a node with a positioning or location determination functionality. In LTE, for example, the positioning node may be a positioning platform in the user plane (e.g., SLP in LTE) or a positioning platform in the control plane (e.g., e-SMLC in LTE). SLP may further include SUPL location center (SLC) and SUPL positioning center (SPC) functionalities. The SPC may have a proprietary interface with e-SMLC. In an embodiment, the positioning functionality may also be split among two or more nodes. For example, there may be a gateway node to a LMU and a e-SMLC, where the gateway node may be a network node, such as a radio base station. The positioning node in the example may refer to an e-SMLC. In a testing environment, a positioning node may be emulated by test equipment.

Exemplary Measurement Management Node

Figure 17:
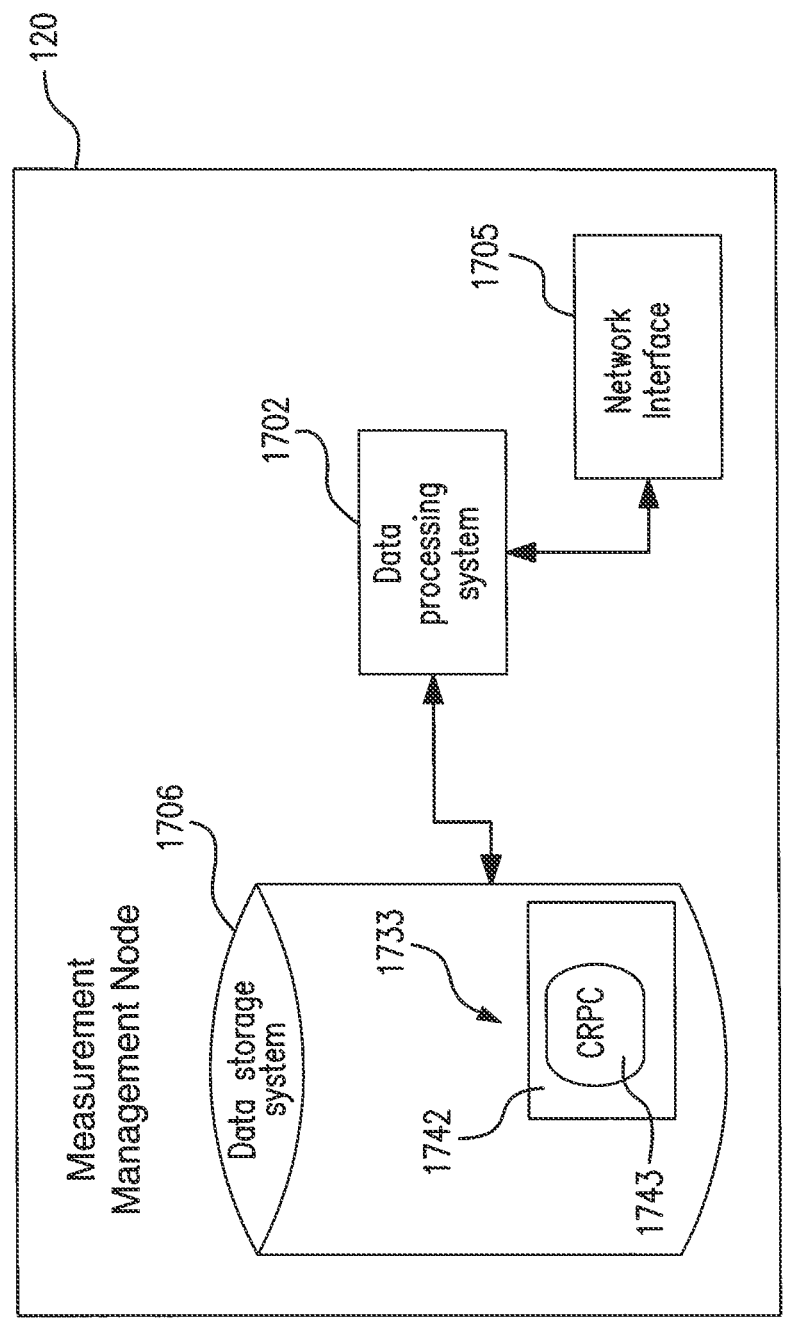
FIG. 17 illustrates a measurement management node according to one embodiment of the present disclosure.

FIG. 17 illustrates a block diagram of a measurement management node 120 according to some embodiments. As shown in FIG. 17, measurement management node 120 may include: a data processing system 1702, which may include one or more processors (e.g., microprocessors) and/or one or more circuits, such as an application specific integrated circuit (ASIC), Field-programmable gate arrays (FPGAs), etc.; a transceiver 1705 for receiving message from, and transmitting messages to, another apparatus; a data storage system 1706, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1702 includes a processor (e.g., a microprocessor), a computer program product 1733 may be provided, which computer program product includes: computer readable program code 1743 (e.g., instructions), which implements a computer program, stored on a computer readable medium 1742 of data storage system 1706, such as, but not limited, to magnetic media (e.g., a hard disk), optical media (e.g., a DVD), memory devices (e.g., random access memory), etc. In some embodiments, computer readable program code 1743 is configured such that, when executed by data processing system 1702, code 1743 causes the data processing system 1702 to perform steps described herein. In some embodiments, measurement management node 120 may be configured to perform steps described above without the need for code 1743. For example, data processing system 1702 may consist merely of specialized hardware, such as one or more application-specific integrated circuits (ASICs). Hence, the features of the present invention described above may be implemented in hardware and/or software.

Coordinating Node

The term "coordinating node" used herein includes, for example, a network node. The coordinating node coordinates radio resources of one or more radio nodes. Some examples of the coordinating node are a network monitoring and configuration node, an OSS node, an O&M node, a MDT node, a SON node, a positioning node, MME node, a gateway node (e.g., Packet Data Network Gateway (P-GW) or Serving Gateway (S-GW) network node), a femto gateway node, a macro node coordinating smaller radio nodes associated with it, an eNodeB coordinating resources with other eNodeBs, or any combination thereof.

Signal Measuring Nodes

The signal measuring node discussed above includes, for instance, a location measurement unit (LMU) integrated within a base station (e.g., a LMU integrated within a NB or eNB), a stand-alone LMU that has signal processing hardware but that shares an antenna with the base station, or a stand-alone LMU with its own signal processing hardware and antenna. In an embodiment, different measuring nodes may vary substantially in terms of their measurement capabilities, such as their ability to receive multiple signals in a same time window or their signal processing capabilities. However, current use of measuring nodes does not take into account the different limitations in capability among measuring nodes, and assumes that a measuring node has the capability to perform multiple UL measurements for any number of UL signals, any number of WCDs, over any frequency range or number of frequency bands, and over all radio access technologies (RATs). Implementing a measuring node able to cover such a wide range of scenarios would require high complexity and incur high cost. The embodiments illustrated above thus address the determination of a measuring node's capability for performing parallel measurements and, in some embodiments, making adjustments based on that capability.

In instances where the measuring node both performs UL measurements and facilitates DL measurements, the node's DL parallel measurement capability and the node's UL parallel measurement capability are not always additive. For example, while the measuring node may be configured to support a first maximum number of only parallel DL measurements and configured to support a second maximum number of only parallel UL measurements, the maximum number of both DL and UL measurements that the measurement node is capable of performing in parallel may be smaller than the sum of the first maximum number and the second maximum number.

Figure 18A:
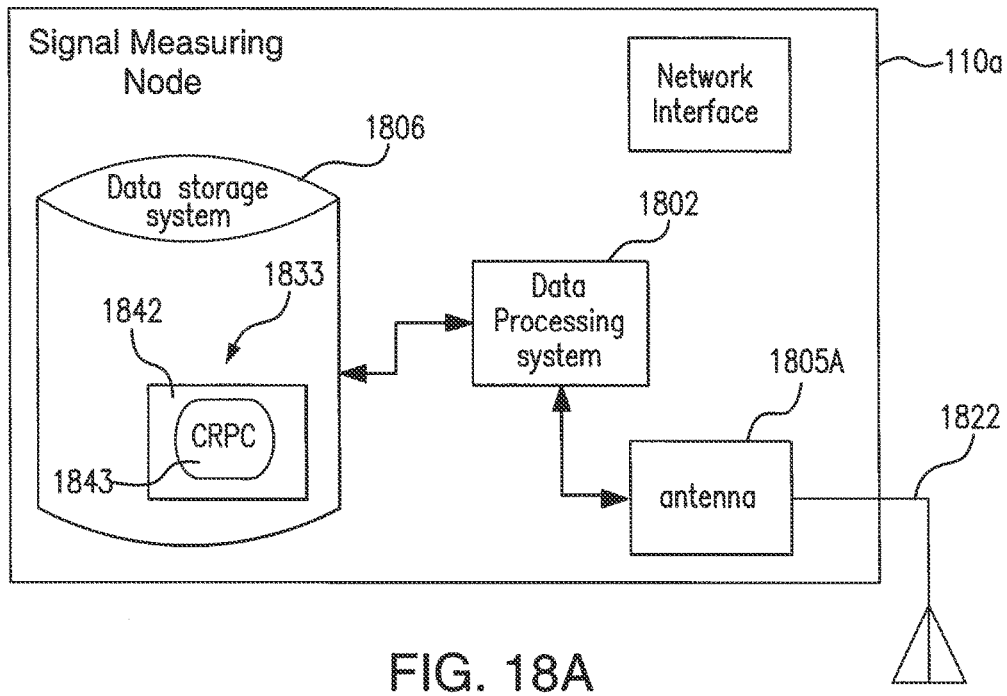
FIG. 18A-18B illustrates signal measuring nodes according to embodiments of the present disclosure.
Figure 18B:
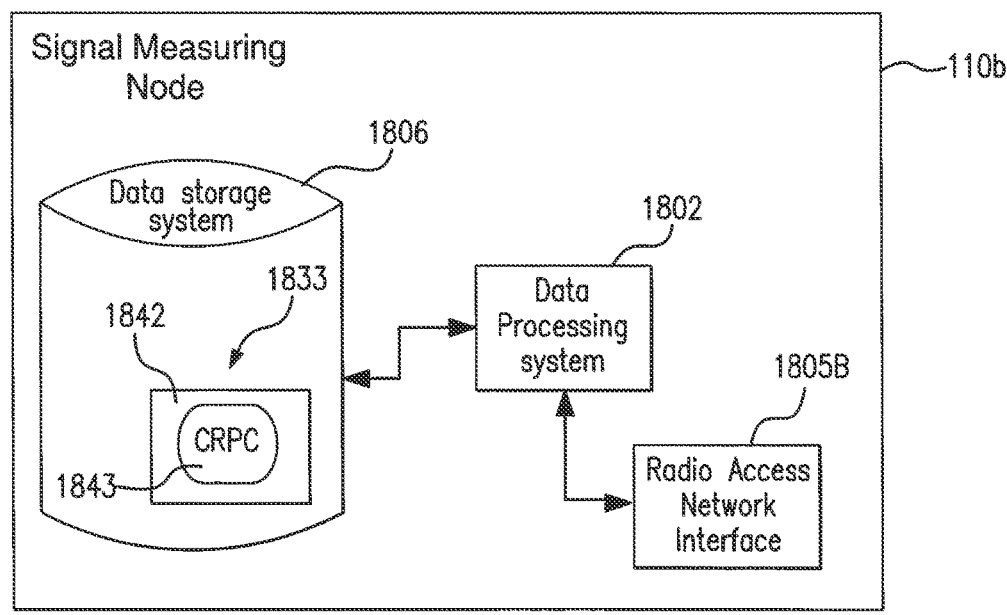

If the measuring node is configured to adapt its receiver configuration to meet its measurement capability, it may apply the adaptaion, for example, a) only to DL measurements to meet the DL+UL capability and UL capability, b) only to UL measurements to meet the DL+UL capability and DL capability, or c) to both DL and UL capability to meet the DL+UL capability Exemplary Signal Measuring Node FIGS. 18A and 18B illustrate a block diagram of a signal measuring node 110a and 110b, respectively. The signal measuring node 110*a* illustrated in FIG. 18A has radio equipment for receiving UL signals, while the signal measuring node 110*b* illustrated in FIG. 18B does not have its own radio equipment, and instead relies on a radio access network (RAN) interface to receive UL signals received by another device's radio equipment. As shown in FIG. 18A, signal measuring node 110*a* may include: a data processing system 1802, which may include one or more processors (e.g., microprocessors) and/or one or more circuits, such as an application specific integrated circuit (ASIC), Field-programmable gate arrays (FPGAs), etc.; an antenna 1805A for receiving message from, and transmitting messages to, another apparatus; a data storage system 1806, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1802 includes a processor (e.g., a microprocessor), a computer program product 1833 may be provided, which computer program product includes: computer readable program code 1843 (e.g., instructions), which implements a computer program, stored on a computer readable medium 1842 of data storage system 1806, such as, but not limited, to magnetic media (e.g., a hard disk), optical media (e.g., a DVD), memory devices (e.g., random access memory), etc. In some embodiments, computer readable program code 1843 is configured such that, when executed by data processing system 1802, code 1843 causes the data processing system 1802 to perform steps described herein. In some embodiments, signal measuring node 110*a* may be configured to perform steps described above without the need for code 1843. For example, data processing system 1802 may consist merely of specialized hardware, such as one or more application-specific integrated circuits (ASICs). Hence, the features of the present invention described above may be implemented in hardware and/or software.

As shown in FIG. 18B, signal measuring node 110*b* may include elements similar to those in signal measuring node 110*a*. However, signal measuring node 110*b* does not have an antenna, and instead has a radio access network (RAN) interface 1805B. In an embodiment, the RAN interface may interface with a base station, and may receive UL signals received by the base station.

Wireless Communication Device (WCD)

In general, a wireless communication device (WCD) may comprise any device equipped with a radio interface and capable of at least generating and transmitting a radio signal to a radio network node. Note that even some radio network nodes, e.g., a relay, a LMU, or a femto BS (aka home BS), may also be equipped with a WCD-like interface. In LTE and UMTS, the WCD includes a user equipment (UE). UEs include a PDA, a laptop, a mobile device, a smartphone, a sensor, a fixed relay, a mobile relay, any radio network node equipped with a UE-like interface (e.g., small RBS, eNodeB, femto BS), or any combination thereof.

Exemplary WCD

Figure 19:
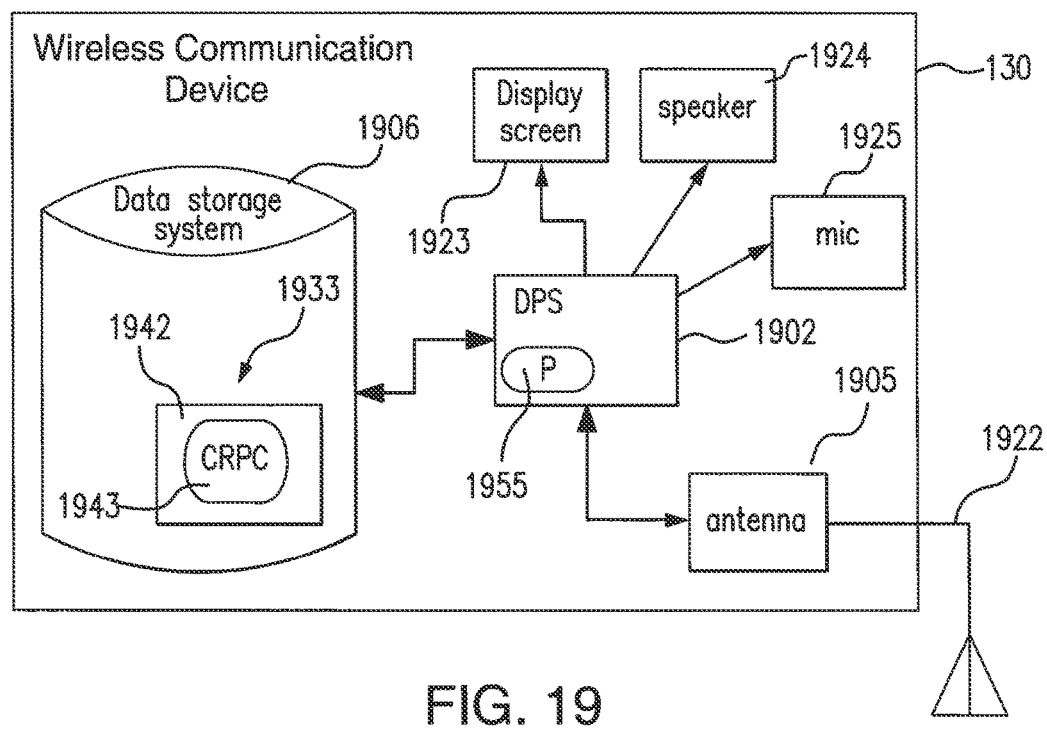
FIG. 19 illustrates wireless communication device (WCD) according to one embodiment of the present disclosure.

FIG. 19 illustrates a block diagram of an example WCD 130. As shown in FIG. 11, WCD 130 includes: a data processing system (DPS) 1902, which may include one or more processors (P) 1955 (e.g., microprocessors) and/or one or more circuits, such as an application specific integrated circuit (ASIC), Field-programmable gate arrays (FPGAs), etc.; a transceiver 1905, connected to an antenna 1922, for receiving messages from, and transmitting messages to, various access points; a data storage system 1906, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 1902 includes a processor 1955 (e.g., a microprocessor), a computer program product 1933 may be provided, which computer program product includes: computer readable program code 1943 (e.g., instructions), which implements a computer program, stored on a computer readable medium 1942 of data storage system 1906, such as, but not limited, to magnetic media (e.g., a hard disk), optical media (e.g., a DVD), memory devices (e.g., random access memory), etc. In some embodiments, computer readable program code 1943 is configured such that, when executed by data processing system 1902, code 1943 causes the data processing system 1902 to perform steps described herein.

In some embodiments, WCD 130 is configured to perform steps described above without the need for code 1943. For example, data processing system 1902 may consist merely of specialized hardware, such as one or more application-specific integrated circuits (ASICs). Hence, the features of the present invention described above may be implemented in hardware and/or software. For example, in some embodiments, the functional components of UE 130 described above may be implemented by data processing system 1902 executing program code 1943, by data processing system 1902 operating independent of any computer program code 1943, or by any suitable combination of hardware and/or software.

In a second embodiment, WCD 130 further includes: 1) a display screen 1923 coupled to the data processing system 1902 that enables the data processing system 1902 to display information to a user of UE 130; 2) a speaker 1924 coupled to the data processing system 1902 that enables the data processing system 1902 to output audio to the user of UE 130; and 3) a microphone 1925 coupled to the data processing system 1902 that enables the data processing system 1902 to receive audio from the user.

Applications

The sections below illustrate some applications in which the performance of UL measurements may be used.

Positioning

The UL measurements discussed above may be used in location-based or location-aware services that use knowledge of a WCD's position. Such services may include a shopping assistance application, friend finder application, presence services application, community or social media application, or other application that provide information about a WCD's surroundings.

In addition to such commercial applications, location-based measurements may also be used in government-mandated applications such as the FCC's E911 service. That application allows a network operator to determine the position of an emergency call. It may be used for calls made in an indoor or an outdoor environment.

Although a global positioning system (GPS) may also be used to determine a WCD's position, GPS-based determinations may often have unsatisfactory performance in urban and/or indoor environments. The measurement-based position determinations used in a telecommunications network may replace or complement GPS-based determinations. For example, a GNSS system may use both radio signal measurements and GPS-based measurements. A GNSS system may include an assisted GNSS (A-GNSS) system (e.g., an A-GPS system), which relies on timing measurements performed on satellite signals.

Other techniques or applications for using UL or DL measurements to determine a WCD's position or location are illustrated below:

Cell ID (CID)—a basic positioning method exploiting one or more cell Ids;

Enhanced Cell ID (E-CID)—E-CID techniques may rely on a cell ID, but also uses DL or UL measurements. In LTE or UMTS, such measurements include, for example, Rx–Tx time difference measurement, eNodeB Rx–Tx time difference measurement, RSRP measurement, RSRQ measurement, CPICH measurement, angle of arrival (AOA) measurement, or any combination thereof. E-CID may include adaptive E-CID (A-ECID) techniques.

Observed Time Difference of Arrival (OTDOA)—OTDOA is a technique using timing measurements (e.g., RSTD in LTE) performed by a WCD on DL radio signals. The DL signals may be transmitted by a plurality of base stations.

UL Time Difference of Arrival (UTDOA)—UTDOA is a technique using UL timing measurements (e.g., UL RTOA in LTE) performed by a measuring node on UL radio signals from a WCD.

In a technique based on a time difference of arrival or a time of arrival (OTDOA, UTDOA or GNSS/A-GNSS), a format of a positioning calculation may be an ellipsoid point with uncertainty circle/ellipse/ellipsoid, which is the result of intersection of multiple hyperbolas or hyperbolic arcs (e.g. in the case of OTDOA) or circles or arcs (e.g., in the case of UTDOA, GNSS, or A-GNSS).

A hybrid of the techniques described above or of any other technique may be used. A hybrid technique may include different positioning methods and/or measurements or results. Since the hybrid technique may involve a mix of any of the methods above, a result of a positioning determination may yield, for instance, any of a variety of shapes, such as a polygon.

In an embodiment, cellular positioning techniques may rely on knowledge of an anchor node's location, such as the location of a eNodeB or beacon device (in a OTDOA technique or E-CID technique) or of a LMU antenna (in a UTDOA technique). The anchor node's location may also be used with AECID, hybrid positioning, or other techniques.

Positioning Architecture in LTE

As discussed above, the UL measurements may be used to provide location-based services (LBS). LTE's positioning architecture includes three network elements: the LCS Client, the LCS target, and the LCS Server. The LCS Server is a physical or logical entity managing positioning for a LCS target device by collecting measurements and other location information, assisting a terminal in measurements when necessary, and estimating the LCS target location. A LCS Client is a software and/or hardware entity that interacts with a LCS Server for the purpose of obtaining location information for one or more LCS targets. Although FIG. 2 illustrates LCS client 170 as an external node, in other embodiments the LCS client may be a network node, a public-safety answering point (PSAP), WCD, or radio base station. In an embodiment, the LCS client may reside with a LCS target (e.g., WCD user wants to know where he or she is located). In an embodiment, the LCS server estimates a velocity of the LCS target.

The LCS server (e.g., e-SMLC or SLP) or any other positioning node may calculate a position of a WCD or other node based on one or more measurements from one or more measuring nodes. As an example, LMU-assisted techniques may rely on collecting UL measurements from one or more LMUs and using the UL measurements in a position calculation process such as uplink time difference of arrival (UTDOA).

Although UL measurements may in principle be performed by any radio network node (e.g., a base station), specific UL measurement units (e.g., LMUs) may be used as part of a position architecture. The LMUs may be logical nodes, physical nodes, or any combination thereof.

In the LTE positioning architecture, a measuring node may communicate with a positioning or other network node using a communication protocol such as LTE positioning protocol A (LPPa). LPPa is a protocol between an eNodeB and a LCS Server specified only for control-plane positioning procedures, although it still can assist user-plane positioning by querying eNodeBs for information and eNodeB measurements. LPPa may be used for DL positioning and UL positioning.

In an embodiment, a protocol such as the SLm interface Application Protocol (SlmAP) may be used for communication between a positioning node (e.g., e-SMLC) and a LMU.

Minimization of Drive Tests (MDT)

The UL measurements may be used to implement a minimization of drive tests (MDT) feature in a network. The MDT feature has been introduced in LTE and HSPA release 10. The MDT feature provides means for reducing the effort for operators when gathering information for network planning and optimization. The MDT feature requires that the WCDs log or obtain various types of measurements, events and coverage related information. The logged or collected measurements or relevant information are then sent to the network. This is in contrast to the traditional approach where the operator has to collect similar information by means of the so called drive tests and manual logging. The MDT is described in TS 37.320.

The WCD can collect the measurements during connected states as well as in low activity states (e.g., an idle state in UTRA/E-UTRA, a cell PCH state in UTRA).

The measurement report comprises measurement results for the serving cell and neighbour cells, intra-frequency/inter-frequency/inter-RAT information, time stamp and location information, or radio fingerprinting measurements. The measurements may be collected in idle state (logged MDT) or CONNECTED state (immediate MDT). For immediate MDT, eNodeB measurements may be included in MDT reports.

More specifically, the measurement report for MDT may comprise:

Mobility measurements (e.g., RSRP and RSRQ for E-UTRA, RSCP and Ec/No for UTRA, Pilot Pn Phase and Pilot Strength for CDMA2000).

Radio link failure report

Number of Random Access Preambles transmitted, indication of whether the maximum transmission power was used, number of Msgs sent, contention detected.

Power headroom measurement by the UE (TS 36.213)

Received interference power measurement by eNodeB (TS 36.214)

Data volume measurement by eNodeB, separately for DL and UL

Scheduled IP throughput by eNodeB, separately for DL and UL (TS 36.314)

Self Organizing Network (SON)

The UL measurements may be used to implement a self organizing network (SON) feature in a network. In LTE, the objective of the SON feature is to allow operators to automatically plan and tune the network parameters and configure network nodes.

While a network may rely on manual tuning, such a process consumes enormous amount of time and resources and requires considerable involvement of the work force. In particular due to the network complexity, large number of system parameters, IRAT technologies, etc., it is attractive to have reliable schemes and mechanism which could automatically configure the network whenever necessary. This can be realized by SON, which can be visualized as a set of algorithms and protocols performing the task of automatic network tuning, planning, configuration, setting parameters, or any combination thereof. In order to accomplish this, the SON node requires measurement reports and results from other nodes, such as a WCD or base station.

Reporting Criteria for DL Measurements

For DL measurements, a measuring device such as a WCD may have to meet certain performance requirements related to parallel DL measurements. For example, according to 3GPP TS 36.133, a WCD may be required to track multiple reporting criteria per measurement category (e.g., intra-frequency measurement category, inter-frequency measurement category, or inter-RAT measurement category). A reporting criterion corresponds to either one event (in the case of event-based reporting), to a period (in the case of periodic reporting), or to a no-reporting criterion (in the case where the WCD does not need to transmit reports, but is still expected to perform measurements). The WCD needs to determine that all of the reporting criteria have been satisfied before sending out a measurement-related report. The reporting criteria requirements may specify a set of reporting criteria categories, a number of reporting criteria per category that the WCD has to be able to support in parallel, and a maximum total number of reporting criteria that the WCD has to be able to support in parallel. Supporting the multiple reporting criteria may further involve meeting the measurement accuracy or measurement time requirement while tracking the multiple reporting criteria. WCDs can be configured so that, as long as the measurement configuration being requested of a WCD does not exceed those requirements (e.g., the WCD is not being requested to support more reporting criteria than what is specified in the reporting criteria requirements), the WCD shall meet the performance requirements defined by the standard (e.g., all measurement accuracy and measurement time requirements that are relevant).

The table below illustrates example reporting criteria requirements in TS 36.133, which specifies requirements for WCDs in E-UTRA cells:

| Reporting Criteria for DL Measurements in E-UTRA | | |
|---|---|---|
| Measurement category | $E_{cat}$ | Note |
| Intra-frequency (Note 1) | 9 | E-UTRA intra-frequency cells |
| Intra-frequency UE Rx-Tx time difference | 2 | Intra-frequency UE Rx-Tx time difference measurements reported to E-UTRAN via RRC and to positioning server via LPP. Applies for UE supporting both LPP and UE Rx-Tx time difference measurement. |
| Intra-frequency RSTD (Note 2) | 1 | Intra-frequency RSTD measurement reporting for UE supporting OTDOA; 1 report capable of minimum 16 cell measurements for the intra-frequency |
| Inter-frequency | 7 | E-UTRA inter-frequency cells |
| Inter-frequency RSTD (Note 2) | 1 | Inter-frequency RSTD measurement reporting for UE supporting OTDOA; 1 report capable of minimum 16 cell measurements for at least one inter-frequency |
| Inter-RAT (E-UTRAN FDD or TDD, UTRAN FDD, UTRAN TDD, GSM, cdma2000 1 × RTT and HRPD) | 5 | Only applicable for UE with this (inter-RAT) capability. This requirement ($E_{cat}$ = 5) is per supported RAT. |

Note 1:
When the UE is configured with SCell carrier frequency, $E_{cat}$ for Intra-frequency is applied per serving frequency.
Note 2:
When the UE is configured with SCell carrier frequency, the UE shall be capable of supporting at least 2 reporting criteria for all RSTD measurements configured to be performed on PCell carrier frequency, SCell carrier frequency and inter-frequency carrier. This requirement applies when there is a single on-going LPP OTDOA location session.

The table illustrates requirements in which a WCD has to be capable of supporting up to 9 reporting criteria in parallel per measurement category and 25 reporting criteria in total for all measurement categories. Other factors, such as whether the WCD uses carrier aggregation (CA), may further affect the reporting criteria requirements. For example, if the WCD uses a secondary cell in a carrier aggregation scheme, it may be required to support up to 34 reporting criteria in total for all measurement categories.

Multi-Carrier or Carrier Aggregation Concept

In an embodiment, UL measurements may be performed with multi-carrier or carrier aggregation. The techniques may be used to enhance peak-rates within a technology. For example, it is possible to use multiple 5 MHz carriers in HSPA to enhance the peak-rate within the HSPA network. Similarly in LTE, for example, multiple 20 MHz carriers or even smaller carriers (e.g. 5 MHz) can be aggregated in the UL and/or on DL. Each carrier in multi-carrier or carrier aggregation system is generally termed as a component carrier (CC) or sometimes is also referred to as a cell. In simple words the component carrier (CC) means an individual carrier in a multi-carrier system. The term carrier aggregation (CA) is also called a "multi-carrier system", "multi-cell operation", "multi-carrier operation", "multi-carrier" transmission and/or reception. This means the CA is used for transmission of signaling and data in the uplink and downlink directions. One of the CCs is the primary component carrier (PCC) or simply primary carrier or even anchor carrier. The remaining ones are called secondary component carrier (SCC) or simply secondary carriers or even supplementary carriers. Generally the primary or anchor CC carries the essential UE specific signaling. The primary CC exists in both uplink and downlink direction CA. The network may assign different primary carriers to different WCDs operating in the same sector or cell.

Therefore the WCD may have more than one serving cell in downlink and/or in the uplink: one primary serving cell and one or more secondary serving cells operating on the PCC and SCC respectively. The serving cell is interchangeably called a primary cell (PCell) or primary serving cell (PSC). Similarly, the secondary serving cell is interchangeably called as secondary cell (SCell) or secondary serving cell (SSC). Regardless of the terminology, the PCell and SCell(s) enable the WCD to receive and/or transmit data. More specifically, the PCell and SCell exist in DL and/or UL for the reception and transmission of data by the WCD. The remaining non-serving cells on the PCC and SCC are called neighbor cells.

The CCs belonging to the CA may belong to the same frequency band (aka intra-band CA) or to different frequency bands (inter-band CA) or any combination thereof (e.g. 2 CCs in band A and 1 CC in band B). The inter-band CA comprising carriers distributed over two bands is also called a dual-band-dual-carrier-HSDPA (DB-DC-HSDPA) in HSPA or inter-band CA in LTE. Furthermore the CCs in intra-band CA may be adjacent or non-adjacent in the frequency domain (aka intra-band non-adjacent CA). A hybrid CA comprising of intra-band adjacent, intra-band non-adjacent and inter-band is also possible. Using carrier aggregation between carriers of different technologies is also referred to as "multi-RAT carrier aggregation" or "multi-RAT-multi-carrier system" or "inter-RAT carrier aggregation". For example, the carriers from WCDMA and LTE may be aggregated. In another example, LTE and CDMA2000 carriers are aggregated. For the sake of clarity the carrier aggregation within the same technology as described can be regarded as "intra-RAT" or simply "single RAT" carrier aggregation. The term CA used further herein may refer to any type of carrier aggregation.

The CCs in CA may or may not be co-located in the same site or base station or radio network node (e.g. relay, mobile relay, etc.). For instance, the CCs may originate (i.e. transmitted/received) at different locations (e.g. from non-co-located BS or from BS and RRH or RRU). Examples of combined CA and multi-point communication are DAS, RRH, RRU, CoMP, multi-point transmission/reception, etc. The disclosure also applies to the multi-point carrier aggregation systems.

The multi-carrier operation may be used in conjunction with multi-antenna transmission. For example, signals on each CC may be transmitted by the eNodeB to the UE over two or more transmit antennas or may be received by the eNodeB over two or more receive antennas.

According to Rel-11 carrier aggregation, one or more SCell can also operate on an additional carrier type (ACT), which is also called a new carrier type (NCT). An ACT or NCT is a SCC, but the cells on NCT may contain reduced number of certain type of signals in time and/or in the frequency domain. For example, a cell on NCT may contain cell specific reference signals (CRS) only in one subframe per 5 ms. The CRS may also be reduced in the frequency domain (e.g., CRS over central 25 RBs even if cell BW is larger than 25 RBs). In a legacy carrier, the CRS are transmitted in every subframe over the entire bandwidth. Also, synchronization signals may potentially have a reduced density in time, compared to the legacy (e.g., 5 ms in the legacy network), and may even be transmitted according to a configurable pattern. The SCell on NCT is therefore used for receiving data, whereas important control information is mainly sent on the PCell which is transmitted on PCC. The PCC is a normal legacy carrier (e.g., it contains all Rel-8 common channels and signals).

The signaling described in the disclosure is either via direct links or logical links (e.g. via higher layer protocols and/or via one or more network and/or radio nodes). For example, signaling from a coordinating node may pass another network node, e.g., a radio network node.

By applying the disclosure according to the embodiments described, the described problem of overloading or under-utilizing signal measuring nodes with parallel UL measurements may be overcome.

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method of performing parallel uplink wireless signal measurements, comprising:
   determining, at a signal measuring apparatus, information on uplink (UL) measurements, wherein the UL measurements comprise uplink wireless signal measurements being performed or to be performed by the signal measuring apparatus over a predetermined measurement period;
   determining, at the signal measuring apparatus, a capability of the signal measuring apparatus to perform parallel measurements, wherein the capability comprises a number of measurements that can be performed in parallel by the signal measuring apparatus;
   adjusting, at the signal measuring apparatus, a measurement requirement based on a comparison of the UL measurements being performed or to be performed with the capability of the signal measuring apparatus to perform parallel measurements; and
   performing, by the signal measuring apparatus, the UL measurements based on the adjusted measurement requirement,
   wherein the signal measuring apparatus is a location measuring unit (LMU).

2. The method of claim 1, further comprising adjusting a receiver configuration of the signal measuring apparatus or causing a wireless communication device (WCD) being measured to adjust a transmission configuration of the WCD, wherein the adjustment is based on the comparison.

3. The method of claim 2, wherein the receiver configuration includes at least one of a receiver type, a measurement bandwidth, a number of activated antenna ports, an antenna reception scheme, a carrier frequency, an activation state of one or more receivers of the signal measuring apparatus, an antenna transmission, an antenna reception mode, a measurement period over which the UL signal measurements are being performed or are to be performed, and a number of measurement samples for performing the UL signal measurements, and wherein the transmission configuration includes at least one of a transmission bandwidth, a number of transmit antenna ports used, an antenna transmission scheme, and a carrier frequency.

4. The method of claim 2, wherein adjusting the measurement requirement is based on at least one of an interference condition of a channel through which a UL signal is received, a bandwidth of the UL signal, a carrier configuration of the UL signal, a radio access technology (RAT) corresponding to the UL signal, whether the UL signal is transmitted in a duplex mode, whether multiple carrier frequencies are used for the UL signal measurements, whether different UL signals are used for one of the UL signal measurements, and a WCD configuration of the WCD.

5. The method of claim 1, wherein the measurement requirement defines the predetermined measurement period over which the UL signal measurements are to be performed or a measurement accuracy of the UL signal measurements, and wherein the comparison indicates whether a number of the UL signal measurements being performed or to be performed by the signal measuring apparatus exceed a number of measurements that can be performed in parallel by the signal measuring apparatus.

6. The method of claim 5, wherein adjusting the measurement requirement comprises extending the predetermined measurement period in response to determining that the UL signal measurements being performed or to be performed exceed the number of measurements that can be performed in parallel by the signal measuring apparatus.

7. The method of claim 1, wherein a total number of the UL signal measurements being performed or to be performed exceeds a maximum number of measurements that the signal measuring apparatus can perform over the predetermined measurement period, and wherein the predetermined measurement period is extended based on an amount by which the total number of UL signal measurements exceeds the maximum number of UL signal measurements.

8. The method of claim 1, wherein performing the UL signal measurements comprises receiving a plurality of sounding reference signals (SRSs), and wherein the adjusted predetermined measurement period is determined as TSRS*(M−1)×n/N+A, wherein M is a total number of the plurality of received SRS's, TSRS is a time period between each of the plurality of SRS's, n is a total number of the UL signal measurements being performed or to be performed by the signal measuring apparatus over the predetermined measurement period, N is a maximum number of measurements supported by the signal measuring apparatus over the predetermined measurement period, and A is a SRS sampling or processing time.

9. The method of claim 5, wherein adjusting the measurement requirement comprises reducing the measurement accuracy in response to determining that the UL signal measurements being performed or to be performed exceed the number of measurements that can be performed in parallel by the signal measuring apparatus.

10. The method of claim 9, wherein reducing the measurement accuracy comprises reducing a duration used to perform each of the UL signal measurements, and wherein the reduced duration is equal to the predetermined measurement period divided by a total number of the UL signal measurements being performed or to be performed over the predetermined measurement period.

11. The method of claim 9, wherein performing the UL signal measurements comprises obtaining measurement samples over a measurement bandwidth, and wherein reducing the measurement accuracy comprises reducing at least one of a number of the measurement samples to be obtained and the measurement bandwidth.

12. The method of claim 1, wherein performing two of the UL signal measurements comprises performing two different calculations on a same UL signal.

13. A signal measuring apparatus for performing parallel uplink wireless signal measurements, comprising:
one or more memories; and
processing circuitry coupled to the one or more memories and configured to:
determine, at a signal measuring apparatus, information on uplink (UL) measurements, wherein the UL measurements comprise uplink wireless signal measurements being performed or to be performed by the signal measuring apparatus over a predetermined measurement period;
determine, at the signal measuring apparatus, a capability of the signal measuring apparatus to perform parallel measurements, wherein the capability comprises a number of measurements that can be performed in parallel by the signal measuring apparatus;
adjust a measurement requirement based on a comparison of the UL measurements being performed or to be performed with the capability of the signal measuring apparatus to perform parallel measurements; and
perform, by the signal measuring apparatus, the UL measurements based on the adjusted measurement requirement,
wherein the signal measuring apparatus is a location measuring unit (LMU).

14. The signal measuring apparatus of claim 13, wherein the processing circuitry is configured to adjust a receiver configuration of the signal measuring apparatus or cause a wireless communication device (WCD) being measured to adjust a transmission configuration of the WCD, wherein the adjustment is based on the comparison.

15. The signal measuring apparatus of claim 14, wherein the receiver configuration includes at least one of a receiver type, a measurement bandwidth, a number of activated antenna ports, an antenna reception scheme, a carrier frequency, an activation state of one or more receivers of the signal measuring apparatus, an antenna transmission, an antenna reception mode, a measurement period over which the UL signal measurements are being performed or to be performed, and a number of measurement samples for performing the UL signal measurements, and
wherein the transmission configuration includes at least one of a transmission bandwidth, a number of transmit antenna ports used, an antenna transmission scheme, and a carrier frequency.

16. The signal measuring apparatus of claim 15, wherein the processing circuitry is configured to adjust the measurement requirement, receiver configuration, or transmission configuration based on at least one of an interference condition of a channel through which a UL signal is received, a bandwidth of the UL signal, a carrier configuration of the UL signal, a radio access technology (RAT) corresponding to the UL signal, whether the UL signal is transmitted in a duplex mode, whether multiple carrier frequencies are used for the UL signal measurements, whether different UL signals are used for one of the UL signal measurements, and a WCD configuration of the WCD.

17. The signal measuring apparatus of claim 14, wherein the measurement requirement defines a predetermined measurement period over which the UL signal measurements are being performed or to be performed, or a measurement accuracy of the UL signal measurements, and wherein the comparison indicates whether the UL signal measurements being performed or to be performed by the signal measuring apparatus exceed a number of measurements that can be performed in parallel by the signal measuring apparatus.

18. The signal measuring apparatus of claim 13, wherein the processing circuitry is configured to adjust the measurement requirement by extending the predetermined measurement period in response to determining that the UL signal measurements being performed or to be performed exceed the number of measurements that can be performed in parallel by the signal measuring apparatus.

19. The signal measuring apparatus of claim 18, wherein a total number of the UL signal measurements being performed or to be performed exceeds a maximum number of UL measurements that the signal measuring apparatus can perform over the predetermined measurement period, and wherein the predetermined measurement period is extended based on an amount by which the total number of UL signal measurements exceeds the maximum number of UL signal measurements.

20. The signal measuring apparatus of claim 19, wherein the processing circuitry is configured to perform the UL signal measurements by receiving a plurality of sounding reference signals (SRSs), and wherein the adjusted predetermined measurement period is determined as $TSRS \times (M-1) \times n/N + \Delta$, wherein M is a total number of the plurality of received SRS's, TSRS is a time period between each of the plurality of SRS's, n is a total number of the UL signal measurements being performed or to be performed by the signal measuring apparatus over the predetermined measurement period, N is a maximum number of UL measurements supported by the signal measuring apparatus over the predetermined measurement period, and $\Delta$ is a SRS sampling or processing time.

21. The signal measuring apparatus of claim 17, wherein the processing circuitry is configured to adjust the measurement requirement by reducing the measurement accuracy in response to determining that a number of UL signal measurements being performed or to be performed exceed a number of measurements that can be performed in parallel by the signal measuring apparatus.

22. The signal measuring apparatus of claim 19, wherein the processing circuitry is configured to reduce the measurement accuracy by reducing a duration used to perform each of the UL signal measurements, and wherein the reduced duration is equal to the predetermined measurement period divided by a total number of the UL signal measurements being performed or to be performed over the predetermined measurement period.

23. The signal measuring apparatus of claim 19, wherein the processing circuitry is configured to perform the UL signal measurements by obtaining measurement samples over a measurement bandwidth, and wherein the processing circuitry is configured to reduce the measurement accuracy by reducing at least one of a number of the measurement samples to be obtained and the measurement bandwidth.

24. The signal measuring apparatus of claim 13, wherein the processing circuitry is configured to perform two of the UL signal measurements by performing two different calculations on a same uplink wireless signal.

* * * * *